United States Patent
Kho et al.

(10) Patent No.: US 11,843,914 B2
(45) Date of Patent: Dec. 12, 2023

(54) SOUND-GENERATING APPARATUS AND VEHICLE INCLUDING THE SAME

(71) Applicant: LG Display Co., Ltd., Seoul (KR)

(72) Inventors: YuSeon Kho, Paju-si (KR); Yong-Su Ham, Paju-si (KR); YongWoo Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 180 days.

(21) Appl. No.: 17/542,063

(22) Filed: Dec. 3, 2021

(65) Prior Publication Data
US 2022/0201400 A1 Jun. 23, 2022

(30) Foreign Application Priority Data
Dec. 23, 2020 (KR) .......... 10-2020-0182240

(51) Int. Cl.
*H04R 17/00* (2006.01)
*H04R 1/02* (2006.01)
*B60Q 9/00* (2006.01)

(52) U.S. Cl.
CPC ............. *H04R 17/00* (2013.01); *B60Q 9/00* (2013.01); *H04R 1/025* (2013.01); *H04R 2499/13* (2013.01)

(58) Field of Classification Search
CPC .... H04R 17/00; H04R 1/025; H04R 2499/13; B60Q 9/00
USPC .......................................................... 381/86
See application file for complete search history.

(56) References Cited

U.S. PATENT DOCUMENTS

| 10,471,903 B1 * | 11/2019 | Jordan ................... H04R 1/403 |
| 11,630,635 B2 * | 4/2023 | Cho ........................ G06F 3/16 |
| | | 381/152 |
| 2017/0164078 A1 * | 6/2017 | Yoon ...................... H04R 1/403 |

FOREIGN PATENT DOCUMENTS

CA 2960072 C * 7/2020 ............. H04R 17/00

\* cited by examiner

*Primary Examiner* — Sean H Nguyen
(74) *Attorney, Agent, or Firm* — Morgan, Lewis & Bockius LLP

(57) ABSTRACT

A sound-generating apparatus and a vehicle including the same are provided. A sound-generating apparatus includes: a plurality of first portions at each of first to third regions, and a plurality of second portions between the plurality of first portions, at each of the first to third regions, wherein two or more second portions, at any one region, among the first to third regions, have a cross-sectional shape that differs from a cross-sectional shape of a second portion disposed at each of the other regions, among the first to third regions.

22 Claims, 12 Drawing Sheets

130L: 130L1, 130L2    230: 230A ~ 230D    ◉ : WS

SOUND-GENERATING APPARATUS AND VEHICLE INCLUDING THE SAME

CROSS-REFERENCE TO RELATED APPLICATION(S)

This application claims the benefit of and priority to Korean Patent Application No. 10-2020-0182240, filed on Dec. 23, 2020, the entirety of which is hereby incorporated by reference.

BACKGROUND

1. Technical Field

The present disclosure relates to a sound-generating apparatus and a vehicle including the same.

2. Discussion of the Related Art

Vehicles include a sound-generating apparatus that outputs sound based on an audio signal output from a multimedia device, such as a car audio device. For example, the sound-generating apparatus applied to vehicles may include a front speaker and a rear speaker, which may be configured as a coil type.

However, a sound-generating apparatus of the vehicles has a limitation in outputting a realistic sound and/or stereo sound in a multichannel through a front speaker and a rear speaker. In the sound-generating apparatus of the vehicles, when the number of speakers increases, a stereo sound may be output. However, due to a size of a speaker, based on a coil type and a limitation of a space in vehicles, there is a limitation in increasing the number of speakers.

Because the piezoelectric elements are fragile, the piezoelectric elements are easily damaged by an external impact. Thus, the reliability of sound reproduction is low. Also, when a speaker, such as a piezoelectric element, is applied to a flexible display apparatus, there is a problem in which damage occurs due to a fragile characteristic.

SUMMARY

Accordingly, the present disclosure is directed to a sound-generating apparatus and a vehicle including the same that substantially obviate one or more of the issues due to limitations and disadvantages of the related art.

The inventors of the present disclosure have recognized problems of a sound-generating apparatus and a vehicle including the same, and have performed various experiments on a sound-generating apparatus, which may output a realistic sound and/or a stereo sound in a multichannel, and a vehicle including the sound-generating apparatus. Through the various experiments, the inventors have invented a sound-generating apparatus, and a vehicle including the same, having a new structure for enhancing a sound pressure characteristic.

An aspect of the present disclosure is to provide a sound-generating apparatus that enhances a sound pressure characteristic and/or a sound characteristic, and a vehicle including the same.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, there is provided a sound-generating apparatus, including: a plurality of first portions at each of first to third regions, and a plurality of second portions between the plurality of first portions, at each of the first to third regions, wherein two or more second portions, at any one region, among the first to third regions, have a cross-sectional shape that differs from a cross-sectional shape of a second portion disposed at each of the other regions, among the first to third regions.

According to one or more embodiments of the present disclosure, a sound generating apparatus may be disposed based on bending of a bendable region, thereby providing a vehicle or an apparatus for enhancing a sound characteristic and/or a sound pressure level characteristic.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages may be discussed below in conjunction with embodiments of the disclosure. It is to be understood that both the foregoing general description and the following detailed description of the present disclosure may be examples and explanatory, and may be intended to provide further explanation of the disclosure as claimed.

BRIEF DESCRIPTION OF THE DRAWINGS

The accompanying drawings, that may be included to provide a further understanding of the disclosure and may be incorporated in and constitute a part of this disclosure, illustrate embodiments of the disclosure and together with the description serve to explain various principles of the disclosure.

Figure 1:
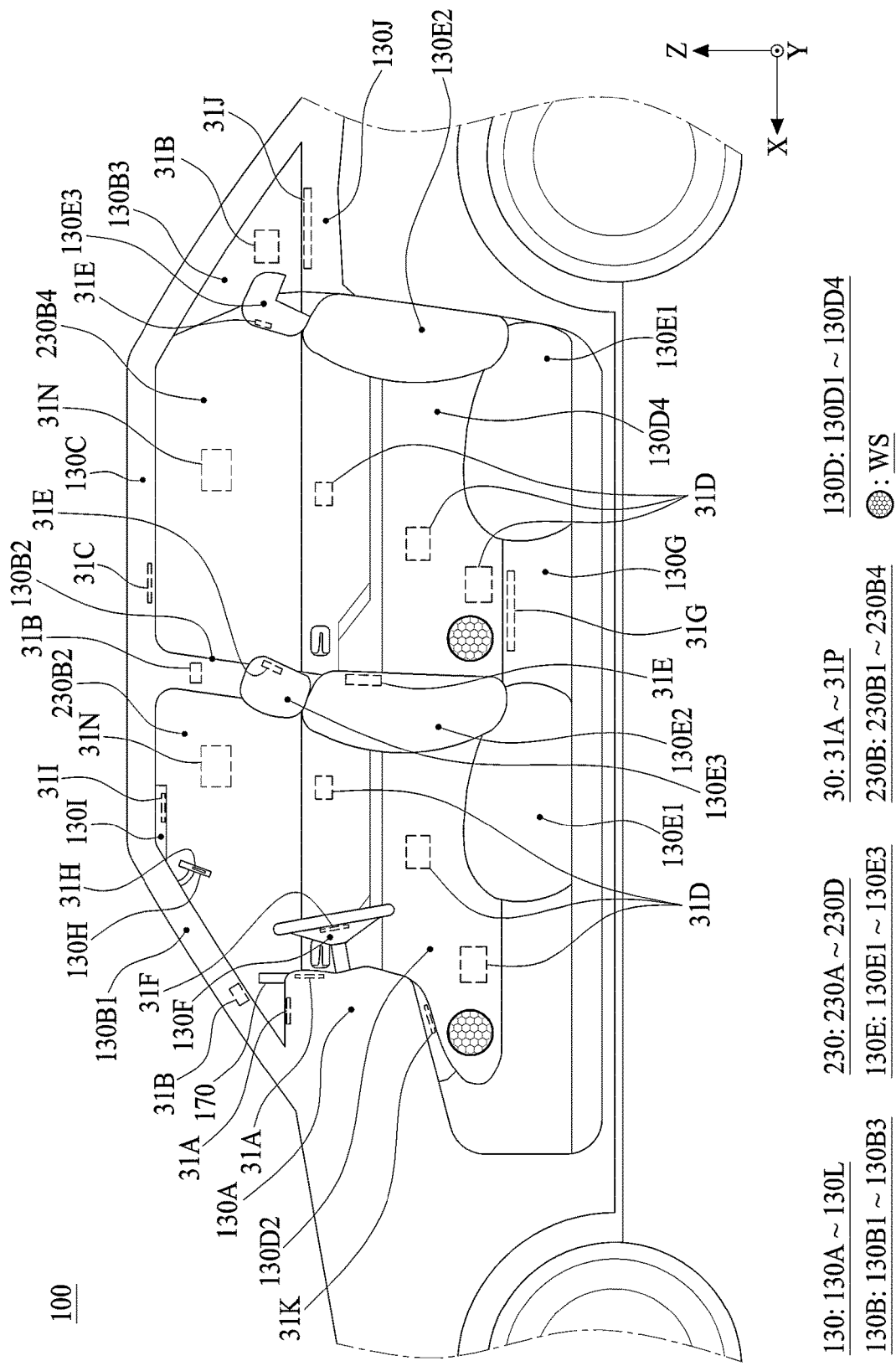
FIG. 1 illustrates a vehicle according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations may be selected only for convenience of writing the specification and may be thus different from those used in actual products.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments may be provided so that this disclosure may be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing embodiments of the present disclosure may be merely an example. Thus, the present disclosure is not limited to the illustrated details. Like reference numerals refer to like elements throughout. In the following description, when the detailed description of the relevant known function or configuration is determined to unnecessarily obscure an important point of the present disclosure, the detailed description of such known function or configuration may be omitted. When terms "include," "have," and "include" described in the present disclosure may be used, another part may be added unless a more limiting term, such as "only," is used. The terms of a singular form may include plural forms unless referred to the contrary.

In construing an element, the element is construed as including an error or tolerance range even where no explicit description of such an error or tolerance range. In describing a position relationship, when a position relation between two parts is described as, for example, "on," "over," "under," or "next," one or more other parts may be disposed between the two parts unless a more limiting term, such as "just" or "direct(ly)," is used. In describing a time relationship, when the temporal order is described as, for example, "after," "subsequent," "next," or "before," a case that is not continuous may be included, unless a more limiting term, such as "just," "immediate(ly)," or "direct(ly)," is used.

It will be understood that, although the terms "first," "second," etc. May be used herein to describe various elements, these elements should not be limited by these terms. These terms may be only used to distinguish one element from another. For example, a first element could be termed a second element, and, similarly, a second element could be termed a first element, without departing from the scope of the present disclosure.

In describing elements of the present disclosure, the terms like "first," "second," "A," "B," "(a)," and "(b)" may be used. These terms may be merely for differentiating one element from another element, and the essence, sequence, order, or number of a corresponding element should not be limited by the terms. Also, when an element or layer is described as being "connected," "coupled," or "adhered" to another element or layer, the element or layer can not only be directly connected or adhered to the other element or layer, but also be indirectly connected or adhered to the other element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings may be given merely for the convenience of description, and embodiments of the present disclosure may not be limited thereto.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term "part" or "unit" may apply, for example, to a separate circuit or structure, an integrated circuit, a computational block of a circuit device, or any structure configured to perform a described function as should be understood to one of ordinary skill in the art.

Hereinafter, example embodiments of the present disclosure will be described in detail with reference to the accompanying drawings.

In the present disclosure, an apparatus may include a display apparatus, such as an organic light-emitting display (OLED) module, a liquid crystal module (LCM), or the like, including a display panel and a driver for driving the display panel. Also, the apparatus may include a set device (e.g., a set apparatus) or a set electronic device, such as a notebook computer, a TV, a computer monitor, an equipment apparatus including an automotive apparatus or another type apparatus for vehicles, or a mobile electronic device, such as a smartphone or an electronic pad, which is a complete product (e.g., a final product), including an LCM, an OLED module, or the like.

Therefore, in the present disclosure, examples of the apparatus may include a display apparatus itself, such as an LCM, an OLED module, or the like, and a set device that is a final consumer device or an application product, including the LCM, the OLED module, or the like.

In some embodiments, an LCM or an OLED module, including a display panel and a driver, may be referred to as a "display apparatus," and an electronic device that is a final product, including an LCM or an OLED module, may be referred to as a "set device." For example, the display apparatus may include a display panel, such as an LCD or an OLED, and a source printed circuit board (PCB) which is a controller for driving the display panel. The set device may further include a set PCB, which is a set controller electrically connected to the source PCB to overall control the set device.

A display panel, applied to an embodiment of the present disclosure, may use all types of display panels, such as a liquid crystal display panel, an organic light-emitting diode (OLED) display panel, and an electroluminescent display panel, or the like, but embodiments of the present disclosure are not limited thereto. For example, the display panel may be a display panel capable of generating sound by being vibrated by a vibration apparatus according to an embodiment of the present disclosure. A display panel, applied to a display apparatus according to an embodiment of the present disclosure, is not limited in a shape or a size of the display panel.

For example, when the display panel is the liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin-film transistor (TFT), which is a switching element for adjusting a light transmittance of each of the plurality of pixels, an upper substrate, including a color filter and/or a black matrix or the like, and a liquid crystal layer between the array substrate and the upper substrate.

When the display panel is the organic light-emitting display panel (OLED), the display panel may include a plurality of gate lines, a plurality of data lines, and a plurality of pixels respectively provided in a plurality of pixel areas defined by intersections of the gate lines and the data lines. Also, the display panel may include an array substrate, including a TFT, which is an element for selectively applying a voltage to each of the pixels, an organic light-emitting device layer on the array substrate, and an encapsulation substrate disposed at the array substrate to cover the organic light-emitting device layer. The encapsulation substrate may protect the TFT and the organic light-emitting device layer from an external impact, and may reduce or prevent water or oxygen from penetrating into the organic light-emitting device layer. Also, a layer provided on the array substrate may include an inorganic light-emitting layer, for example, a nano-sized material layer, a quantum dot, a light-emitting layer, or the like. As another embodiment of the present disclosure, the layer provided on the array substrate may include a micro light-emitting diode.

The display panel may further include a backing, such as a metal plate attached at the display panel. However, embodiments of the present disclosure are not limited to the metal plate, and the display panel may further include another structure.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Hereinafter, a sound-generating apparatus for vehicles, and a vehicle including the same, according to embodiments of the present disclosure will be described in detail with reference to the accompanying drawings. In adding reference numerals to elements of each of the drawings, although the same elements are illustrated in other drawings, like reference numerals may refer to like elements. Also, for convenience of description, a scale of each of elements illustrated in the accompanying drawings differs from a real scale, and thus, is not limited to a scale illustrated in the drawings.

FIG. 1 illustrates a vehicle according to an embodiment of the present disclosure.

With reference to the example of FIG. 1, the vehicle 100, according to an embodiment of the present disclosure, may include an interior material (e.g., an interior finish material) 130, a vehicle glass window 230, and a side glass window 230B. The interior material 130 may be referred to as a "vehicle interior material." The vehicle 100 will be described below with reference to the examples of FIGS. 9 to 13.

The vehicle interior material 130 may include all elements configuring an inner portion of the vehicle 100. For example, the vehicle interior material 130 may be an interior member or an inner finish material of the vehicle 100, but embodiments of the present disclosure are not limited thereto.

The vehicle interior material 130, according to an embodiment of the present disclosure, may include a material including one or more of: metal, plastic, fiber, leather, wood, cloth, and glass, but embodiments of the present disclosure are not limited thereto. For example, the vehicle interior material 130, including a plastic material, may include an injection material. The vehicle interior material 130, including a plastic material, may be an injection material that may be implemented by an injection process (e.g., injection molding process) using a thermoplastic resin or a thermosetting resin, but embodiments of the present disclosure are not limited thereto. The vehicle interior material 130, including a fiber material, may include one or more of: a plastic composite fiber, a carbon fiber (e.g., an aramid fiber), and a natural fiber. A surface member, including a fiber material, may include a textile sheet, a knit sheet, or a nonwoven fabric, but embodiments of the present disclosure are not limited thereto. The vehicle interior material 130, including a leather material, may include natural leather or artificial leather, but embodiments of the present disclosure are not limited thereto.

The vehicle interior material 130 according to an embodiment of the present disclosure may include a dashboard 130A, a pillar interior material 130B, a roof interior material 130C, a door interior material 130D, a seat interior material 130E, a handle interior material 130F, and a floor interior material 130G.

According to an embodiment of the present disclosure, a vibration apparatus 30 may be disposed at the vehicle interior material 130, and may vibrate the vehicle interior material 130 to generate sound based on a vibration of the vehicle interior material 130. For example, the vibration apparatus 30 may directly vibrate the vehicle interior material 130 to generate the sound based on a vibration of the vehicle interior material 130. For example, the vibration apparatus 30 may include one or more sound-generating apparatuses 31, which may be disposed one or more of: the dashboard 130A, the pillar interior material 130B, the roof interior material 130C, the door interior material 130D, the seat interior material 130E, the handle interior material 130F, the floor interior material 130G, a rear package interior material, an overhead console, a rear view mirror, a glove box, and a sun visor. Embodiments are not limited to these examples.

The vibration apparatus 30 may include a sound-generating apparatus 31A to 31P. The sound-generating apparatus 31A to 31P may be covered by the vehicle interior material 130. For example, the sound-generating apparatus 31A to 31P may be between the vehicle structure and the vehicle interior material 130, or may be at the vehicle interior material 130.

The sound-generating apparatus 31A to 31P may be configured to vibrate the vehicle interior material 130 to output the sound toward one or more of an inside (e.g., an interior) or an indoor space (e.g., an interior space) of the vehicle 100. According to an embodiment of the present disclosure, the sound-generating apparatus 31A to 31P may vibrate the vehicle interior material 130 to generate the sound based on a vibration of the vehicle interior material 130. For example, the sound-generating apparatus 31A to 31P may vibrate (e.g., directly vibrate) the vehicle interior material 130 to generate the sound, based on a vibration of the vehicle interior material 130. The vehicle interior material 130 may perform a function of a vibration plate, a sound vibration plate, or a sound-generating plate for outputting the sound. For example, the vehicle interior material 130 may have a size that is greater than the sound-generating apparatus 31A to 31P, and thus, may perform a function of a vibration plate, a sound vibration plate, or a sound-generating plate having a large area, thereby enhancing a sound characteristic of a low-pitched sound band of the vibration apparatus 30. For example, a frequency of the sound of the low-pitched sound band may be 500 Hz or less, but embodiments of the present disclosure are not limited thereto.

The sound-generating apparatus 31A to 31P, according to an embodiment of the present disclosure, may include a coil-type sound generator. For example, a sound generator may be referred to as an "actuator," an "exciter," a "transducer," or the like, but embodiments of the present disclosure are not limited thereto.

The vehicle interior material 130, according to an embodiment of the present disclosure, may include one or more of a flat portion (e.g., flat surface portion) and a curved portion (e.g., curved surface portion). For example, the vehicle interior material 130 may have a surface structure corresponding to a surface structure of a corresponding vehicle structure, or may have a surface structure that differs from a surface structure of a corresponding vehicle structure.

The sound-generating apparatus may be configured with a film-type sound generator, based on a shape of a vehicle interior material 130. When the film-type sound generator includes ceramic, the film-type sound generator may be thin and lightweight, but there may be a problem in which it is difficult to apply the film-type sound generator to a large-area apparatus, and it may be difficult to apply the film-type sound generator to an apparatus including a curved portion. When the sound-generating apparatus 31A to 31P is configured with a film-type sound generator, including a piezoelectric composite, there may be a problem in which a sound pressure level characteristic is reduced, as compared to a coil-type sound generator. The coil-type sound generator may have a problem in which a thickness of an apparatus may be thickened, and it may be difficult to place the coil-type sound generator at the curved portion of the vehicle interior material 130. Therefore, the inventors of the present disclosure have performed various experiments for implementing a sound-generating apparatus in which a thickness of an apparatus may not be thickened, sound may be enhanced, and the sound-generating apparatus may be capable of being placed at a curved portion, despite being configured with one film-type sound generator.

Therefore, based on the various experiments, the inventors have invented a sound-generating apparatus having a new structure, which may be applied to an apparatus or a vehicle including a curved portion. This will be described below.

Figure 2:
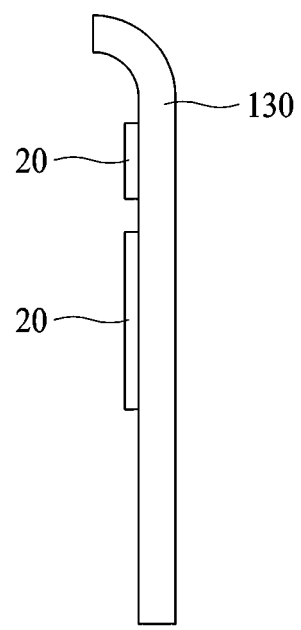
FIG. 2 illustrates an apparatus according to an embodiment of the present disclosure.

FIG. 2 illustrates an apparatus according to an embodiment of the present disclosure.

With reference to the example of FIG. 2, the apparatus (e.g., a vehicle) according to an embodiment of the present disclosure may include a vehicle interior material 130, and a sound-generating apparatus 20 provided at the vehicle interior material 130. The sound-generating apparatus 20 may be provided in plurality.

According to an embodiment of the present disclosure, the sound-generating apparatus 20 may include a film-type sound generator. The sound-generating apparatus 20 may have a problem in which it may be difficult to apply the sound-generating apparatus 20 to a curved portion of the vehicle interior material 130. For example, when bending deformation is applied to the film-type sound generator to be applied to the curved portion, ceramic, which is insufficient in flexibility, may be broken in the curved portion, or an adhesive force of the film-type sound generator may be reduced in the curved portion. Therefore, the inventors have performed various experiments on a sound-generating apparatus capable of being applied to the curved portion. Based on the various experiments, the inventors have invented a sound-generating apparatus capable of being applied to the curved portion. This will be described below.

Figure 3A:
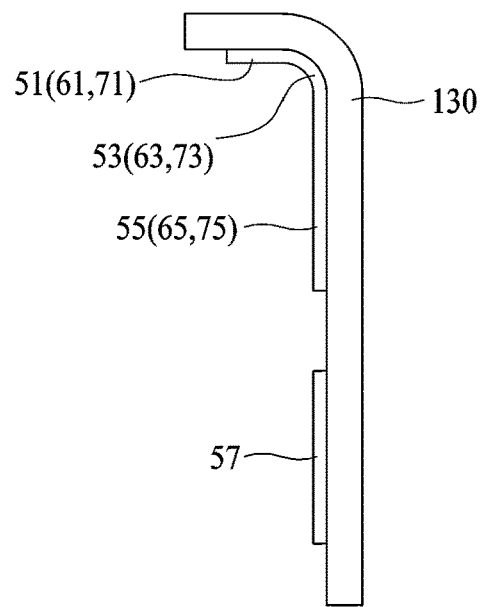
FIGS. 3A and 3B illustrate an apparatus according to another embodiment of the present disclosure.
Figure 3B:
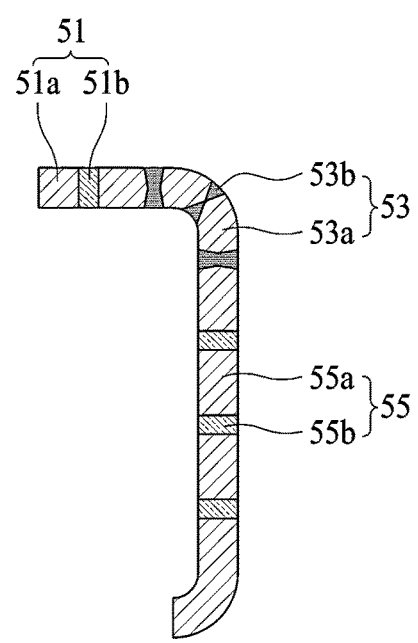

FIGS. 3A and 3B illustrate an apparatus according to another embodiment of the present disclosure.

With reference to the examples of FIGS. 3A and 3B, the apparatus according to another embodiment of the present disclosure may include a vehicle interior material 130, and a sound-generating apparatus provided at the vehicle interior material 130. The vehicle interior material 130, according to another embodiment of the present disclosure, may include one or more of: a dashboard 130A, a roof interior material 130B, and a door interior material 130D.

The vehicle interior material 130 may include a vibration region, including a curved portion. For example, the vibration apparatus may be disposed in the vibration region. For example, the vehicle interior material 130 may include a first region, a second region, and a third region. For example, the third region may be between the first region and the second region.

A first sound-generating apparatus 51 may be disposed at the first region of the vehicle interior material 130. A second sound-generating apparatus 53 may be disposed at the third region of the vehicle interior material 130. A third sound-generating apparatus 55 may be disposed at the second region of the vehicle interior material 130. For example, any one of the first to third regions may be a region that is bendable from other region. For example, the third region may be a bending region that may be bent by 90 degrees from each of the first region and the second region. However, embodiments of the present disclosure are limited thereto. For example, the third region may be a bending region that may be bent by 90 degrees or less, or 90 degrees or more, from each of the first region and the second region. For example, each of the first to third sound-generating apparatuses 51, 53, and 55 may be one or a single sound-generating apparatus. A fourth sound-generating apparatus 57 may be disposed adjacent to the first to third sound-generating apparatuses 51, 53, and 55.

With reference to the example of FIG. 3B, the first sound-generating apparatus 51 may include a plurality of first portions 51a and a plurality of second portions 51b. For example, the second portions 51b may be disposed between two adjacent first portions 51a. For example, a plurality of first portions 51a and a plurality of second portions 51b may be arranged alternately and repeatedly.

According to an embodiment of the present disclosure, the first portion 51a may include an inorganic material, and the second portion 51b may include an organic material. For example, the first portion 51a may have a piezoelectric characteristic, and the second portion 51b may have a ductile characteristic or flexibility. For example, the inorganic material of the first portion 51a may have a piezoelectric characteristic, and the organic material of the second portion 51b may have a ductile characteristic or flexibility.

According to an embodiment of the present disclosure, each of the plurality of second portions 51b may be disposed between the plurality of first portions 51a. For example, in the first sound-generating apparatus 51 disposed in the first region, the first portion 51a and the second portion 51b may have the same shape.

According to an embodiment of the present disclosure, in the third sound-generating apparatus 55 disposed at the second region, the first portion 55a and the second portion 55b may have the same shape. For example, the third sound-generating apparatus 55 may include the first portion 55a and the second portion 55b between first portions 55a. For example, the first sound-generating apparatus 51 and the third sound-generating apparatus 55 may be configured to be equal (e.g., identical).

The second sound-generating apparatus 53 may be disposed at the third region between the first region and the second region. For example, the third region may be a bending region that is bendable from each of the first region and the second region. For example, the second portion 53b of the second sound-generating apparatus 53, disposed at the third region, may have a shape that differs from the second portion 51b and 55b disposed at each of the second region and the third region. For example, in the second sound-generating apparatus 53, disposed in the third region, the second portion 53b may have a shape that differs from the first portion 53a. The second sound-generating apparatus 53 may have a shape that differs from each of the first sound-generating apparatus 51 and the third sound-generating apparatus 55, and thus, may be disposed in a bendable region, thereby solving a problem in which the first portion 53a may be broken or an adhesive force may be reduced, despite vertical bending deformation when being disposed in the bending region. Accordingly, an apparatus or a vehicle having an enhanced sound pressure level characteristic and/or a sound characteristic may be provided.

According to an embodiment of the present disclosure, the second sound-generating apparatus 53 may not be detached or separated from each of the first sound-generating apparatus 51 and the third sound-generating apparatus 55, but may be physically connected to the first sound-generating apparatus 51, and may be physically connected to the third sound-generating apparatus 55. For example, the second sound-generating apparatus 53 may be physically connected to a side surface (e.g., a lateral surface or a sidewall) of each of the first sound-generating apparatus 51 and the third sound-generating apparatus 55. Thus, the first to third sound-generating apparatuses 51, 53, and 55 may be implemented as a single structure material or as one film.

The first portion 51a and the second portion 51b of the first sound-generating apparatus 51 will be described below. Descriptions thereof may be identically applied to first portions 53a and 55a and second portions 53b and 55b of the second sound-generating apparatus 53 and the third sound-generating apparatus 55. The fourth sound-generating apparatus 57 may be configured to be identical to the first portion 51a and the second portion 51b of the first sound-generating apparatus 51. As an embodiment of the present disclosure, the fourth sound-generating apparatus 57 may be configured to be identical to the first portion 55a and the second portion 55b of the second sound-generating apparatus 55.

An inorganic material portion included in each of the plurality of first portions 51a may include a ceramic-based material configured to generate a relatively high vibration, or may include a piezoelectric ceramic having a perovskite crystalline structure. The perovskite crystalline structure may have a piezoelectric effect and an inverse piezoelectric effect, and may be a plate-shaped structure having orientation. The perovskite crystalline structure may be represented by a chemical formula "$ABO_3$". In the chemical formula, "A" may include a divalent metal element, and "B" may include a tetravalent metal element. For example, in the chemical formula "$ABO_3$", "A" and "B" may be cations, and "O" may be anions. For example, the first portions 51a may include one or more of lead(II) titanate ($PbTiO_3$), lead zirconate ($PbZrO_3$), lead zirconate titanate ($PbZrTiO_3$), barium titanate ($BaTiO_3$), and strontium titanate ($SrTiO_3$), but embodiments of the present disclosure are not limited thereto.

In a perovskite crystalline structure, a position of a center ion may be changed by an external stress or a magnetic field to vary polarization, and a piezoelectric effect may be generated based on the variation of the polarization. In a perovskite crystalline structure including $PbTiO_3$, a position of a titanium (Ti) ion corresponding to a center ion may be changed to vary polarization, and thus, a piezoelectric effect may be generated. For example, in the perovskite crystalline structure, a cubic shape having a symmetric structure may be changed to a tetragonal shape, an orthorhombic shape, and a rhombohedral shape, each having an unsymmetric structure, by using an external stress or a magnetic field, and thus, a piezoelectric effect may be generated. Polarization may be high at a morphotropic phase boundary (MPB) of a tetragonal structure and a rhombohedral structure, and polarization may be easily realigned, thereby obtaining a high piezoelectric characteristic.

According to an embodiment of the present disclosure, the inorganic material portion, included in each of the plurality of first portions 51a, may include one or more materials of lead (Pb), zirconium (Zr), titanium (Ti), zinc (Zn), nickel (Ni), and niobium (Nb), but embodiments of the present disclosure are not limited thereto. According to an embodiment of the present disclosure, the inorganic material portion, included in each of the plurality of first portions 51a, may include a lead zirconate titanate (PZT)-based material, including lead (Pb), zirconium (Zr), and titanium (Ti); or may include a lead zirconate nickel niobate (PZNN)-based material, including lead (Pb), zirconium (Zr), nickel (Ni), and niobium (Nb), but embodiments of the present disclosure are not limited thereto. Also, the inorganic material portion may include one or more of: calcium titanate ($CaTiO_3$), $BaTiO_3$, and $SrTiO_3$, each without Pb, but embodiments of the present disclosure are not limited thereto.

According to another embodiment of the present disclosure, the inorganic material portion, included in each of the plurality of first portions 51a, may have a piezoelectric deformation coefficient "$d_{33}$" of 1,000 pC/N or more in a thickness direction Z. The vibration apparatus may be applied to a display panel having a large size, and may need to have a high piezoelectric deformation coefficient "$d_{33}$", for having a sufficient vibration characteristic or piezoelectric characteristic. For example, to have a high piezoelectric deformation coefficient "$d_{33}$", the inorganic material portion may include a PZT-based material ($PbZrTiO_3$) as a main component, and may include a softener dopant material doped into "A" site (Pb) and a relaxor ferroelectric material doped into "B" site (ZrTi).

The softener dopant material may enhance a piezoelectric characteristic and a dielectric characteristic of the inorganic material portion, and for example, may increase the piezoelectric deformation coefficient "$d_{33}$" of the inorganic material portion. The softener dopant material, according to an embodiment of the present disclosure, may include a dyad element "+2" to a triad element "+3". Morphotropic phase boundary (MPB) may be implemented by adding the softener dopant material to the PZT-based material ($PbZrTiO_3$), and thus, a piezoelectric characteristic and a dielectric characteristic may be enhanced. For example, the softener dopant material may include one or more of: strontium (Sr), barium (Ba), lanthanum (La), neodymium (Nd), calcium (Ca), yttrium (Y), erbium (Er), or ytterbium (Yb). For example, ions (for example, $Sr^{2+}$, $Ba^{2+}$, $La^{2+}$, $Nd^{3+}$, $Ca^{2+}$, $Y^{3+}$, $Er^{3+}$, and $Yb^{3+}$) of the softener dopant material doped into the PZT-based material ($PbZrTiO_3$) may substitute a portion of lead (Pb) in the PZT-based material ($PbZrTiO_3$), and a substitution rate thereof may be about 2 mol % to about 20 mol %. For example, when the substitution rate is smaller than 2 mol % or greater than 20 mol %, a perovskite crystal structure may be broken, and thus, an electromechanical coupling coefficient "kP" and the piezoelectric deformation coefficient "$d_{33}$" may decrease. When the softener dopant material is substituted, the MPB may be formed, and a piezoelectric characteristic and a dielectric characteristic may be high in the MPB, thereby implementing a vibration apparatus having a high piezoelectric characteristic and a high dielectric characteristic.

According to an embodiment of the present disclosure, the relaxor ferroelectric material doped into the PZT-based material ($PbZrTiO_3$) may enhance an electric deformation characteristic of the inorganic material portion. The relaxor ferroelectric material, according to an embodiment of the present disclosure, may include a lead magnesium niobate (PMN)-based material or a lead nickel niobate (PNN)-based material, but embodiments of the present disclosure are not limited thereto. The PMN-based material may include Pb, Mg, and Nb, and for example, may include $Pb(Mg, Nb)O_3$. The PNN-based material may include Pb, Ni, and Nb, and for example, may include $Pb(Ni, Nb)O_3$. For example, the relaxor ferroelectric material doped into the PZT-based material ($PbZrTiO_3$) may substitute a portion of each of zirconium (Zr) and titanium (Ti) in the PZT-based material ($PbZrTiO_3$), and a substitution rate thereof may be about 5 mol % to about 25 mol %. For example, when the substitution rate is smaller than 5 mol % or greater than 25 mol %, a perovskite crystal structure may be broken, and thus, the electromechanical coupling coefficient "kP" and the piezoelectric deformation coefficient "$d_{33}$" may decrease.

According to an embodiment of the present disclosure, the inorganic material portion, included in each of the plurality of first portions 51a, may further include a donor material doped into "B" site (ZrTi) of the PZT-based material ($PbZrTiO_3$), to further enhance a piezoelectric coefficient. For example, the donor material doped into the "B" site (ZrTi) may include a tetrad element "+4" or a hexad element "+6". For example, the donor material doped into the B site (ZrTi) may include one or more of: tellurium (Te), germanium (Ge), uranium (U), bismuth (Bi), niobium (Nb), tantalum (Ta), antimony (Sb), or tungsten (W). The inorganic material portion, included in each of the plurality of first portions 51a, according to an embodiment of the present disclosure, may have a piezoelectric deformation coefficient "$d_{33}$" of 1,000 pC/N or more in a thickness direction Z, thereby implementing a sound-generating apparatus having an enhanced vibration characteristic.

The second portion 51b may be disposed between the plurality of first portions 51a, or may be disposed to surround each of the plurality of first portions 51a. Therefore, in the sound-generating apparatus, vibration energy, based on a link in a unit lattice of each first portion 51a, may be increased by the second portion 51b. Thus, a vibration characteristic may increase, and a piezoelectric characteristic and flexibility may be secured. For example, the second portion 51b may include one or more of: an epoxy-based polymer, an acrylic-based polymer, and a silicone-based polymer, but embodiments of the present disclosure are not limited thereto.

The second portion 51b according to an embodiment of the present disclosure may be configured with an organic material portion. For example, each of the organic material portions may be disposed between two adjacent inorganic material portion of the inorganic material portions, and may absorb an impact applied to the inorganic material portion (e.g., the first portion), may release a stress concentrating on the inorganic material portion to enhance the durability of the sound-generating apparatus, and may enable the sound-generating apparatus to have flexibility.

The second portion 51b, according to an embodiment of the present disclosure, may have modulus and viscoelasticity that are lower than each first portion 51a. Thus, the second portion 51b may enhance the reliability of each first portion 51a vulnerable to an impact due to a fragile characteristic. For example, the second portion 51b may include a material having a loss coefficient of about 0.01 to about 1.0 and modulus of about 0.1 gigapascals (GPa) to about 3 GPa.

The organic material portion, included in the second portion 51b, may include one or more of: an organic material, an organic polymer, an organic piezoelectric material, and an organic non-piezoelectric material, which has a flexible characteristic or a ductile characteristic compared to the inorganic material portion of the first portion 51a. For example, the second portion 51b may be referred to as an "adhesive portion," a "stretch portion," a "bending portion,"

a "damping portion," a "flexible portion," or the like, but embodiments of the present disclosure are not limited thereto.

In the sound-generating apparatus according to an embodiment of the present disclosure, the plurality of first portions and the second portion may be disposed at (e.g., connected to) the same plane. Thus, the sound-generating apparatus may have a single thin-film type. For example, the sound-generating apparatus may vibrate in a vertical direction by the first portion 51a having a vibration characteristic, and may be bent in a curved shape by the second portion 51b having flexibility or ductility. Accordingly, the sound-generating apparatus may be easily applied to an apparatus or a vehicle including a curved portion.

Therefore, according to an embodiment of the present disclosure, sound generated by a vibration of the vehicle interior material 130, based on a vibration of one or more sound-generating apparatus, may be output toward an indoor space of a vehicle. Thus, the vehicle interior material 130 may be used as a sound vibration plate. According to an embodiment of the present disclosure, each sound-generating apparatus for vehicles, disposed in the vehicle interior material 130, may vibrate the corresponding vehicle interior material 130 to output a realistic sound in a multichannel or sound including a stereo sound toward the indoor space of the vehicle 100.

Figure 4:
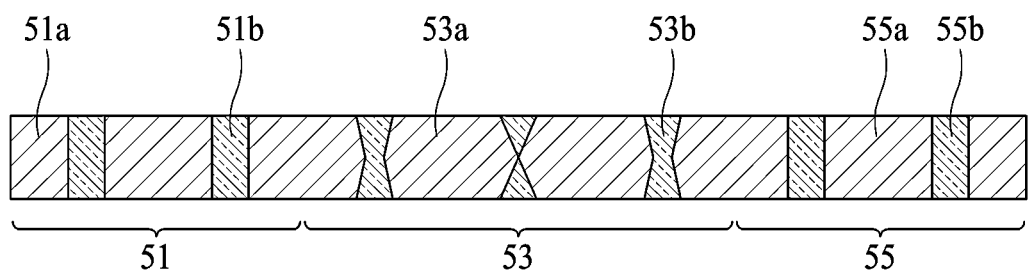
FIG. 4 illustrates a sound-generating apparatus according to another embodiment of the present disclosure.
Figure 5:
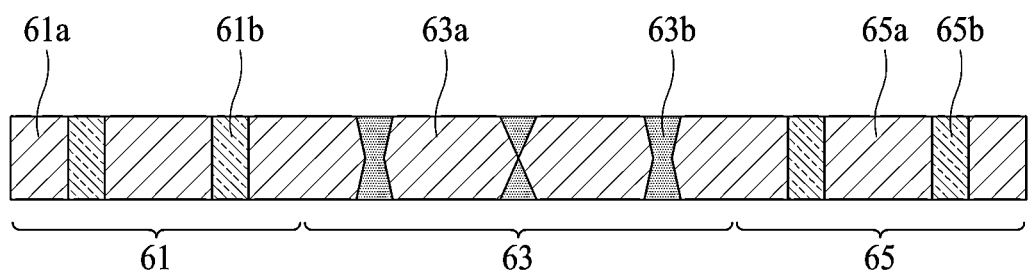
FIG. 5 illustrates a sound-generating apparatus according to another embodiment of the present disclosure.
Figure 6:
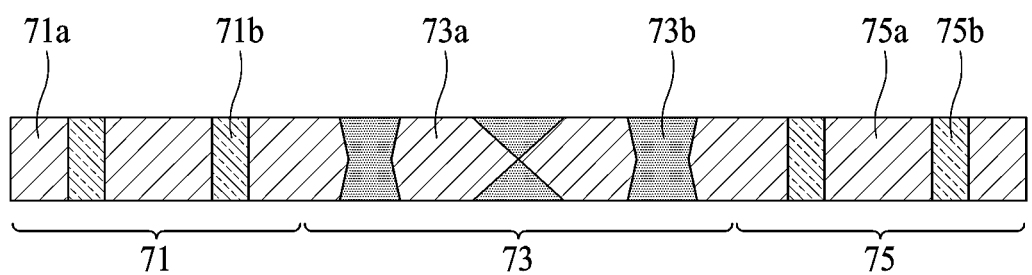
FIG. 6 illustrates a sound-generating apparatus according to another embodiment of the present disclosure.

FIG. 4 illustrates a sound-generating apparatus according to another embodiment of the present disclosure. FIG. 5 illustrates a sound-generating apparatus according to another embodiment of the present disclosure. FIG. 6 illustrates a sound-generating apparatus according to another embodiment of the present disclosure.

With reference to the examples of FIGS. 4 to 6, the sound-generating apparatus according to another embodiment of the present disclosure may include a first sound-generating apparatus 51, a second sound-generating apparatus 53, and a third sound-generating apparatus 55. For example, any one of first to third regions may be a bending region, which may be bent by 90 degrees from the other regions or from an adjacent region. For example, the third region may be between the first region and the second region. For example, the third region may be a bending region that may be bent by 90 degrees from each of the first region and the second region. The term "bendable area" may be used interchangeably with the term "bending region." The first sound-generating apparatus 51 may be disposed at the first region, the third sound-generating apparatus 55 may be disposed at the second region, and the second sound-generating apparatus 53 may be disposed at the third region.

With reference to the example of FIG. 4, the first sound-generating apparatus 51 may include a first portion 51a and a second portion 51b. For example, the second portion 51b may be disposed apart from the first portion 51a by a same interval. For example, the second portion 51b may be a flat pillar, but embodiments of the present disclosure are not limited thereto.

According to an embodiment of the present disclosure, the third sound-generating apparatus 55 may include a first portion 55a and a second portion 55b. For example, the second portion 55b may be disposed apart from the first portion 55a by a same interval. For example, the second portion 55b may be a flat pillar, but embodiments of the present disclosure are not limited thereto. For example, the first sound-generating apparatus 51 and the third sound-generating apparatus 55 may be configured to be equal (e.g., identical). According to an embodiment of the present disclosure, each of the first portions 51a, 53a, and 55a and the second portions 51b, 53b, and 55b of the first to third sound-generating apparatuses 51, 53, and 55 may include a first surface and a second surface opposite to the first surface, and moreover, may include a side surface between the first surface and the second surface.

According to an embodiment of the present disclosure, the second sound-generating apparatus 53 may include the first portion 53a and the second portion 53b. For example, the second portion 53b, including an organic material, may be disposed at the bending region. For example, the second portion 53b may be a curved polymer pillar, but embodiments of the present disclosure are not limited thereto.

The second portion 53a of the third region may have a shape that differs from each of the second portions 51a and 55a respectively disposed in the first region and the second region. For example, a side surface of the second portion 53a of the third region may include a concave portion. A second portion of a region, other than a bendable region, of the first to third regions may include a cross-sectional surface having a tetragonal shape. For example, each of the second portions 51a and 55a respectively disposed at the first region and the second region may include a cross-sectional surface having a tetragonal shape.

At least one first portion 53a disposed between two or more second portions 53b disposed at a bendable region may include a protrusion portion that protrudes toward a concave portion of the second portion 53b adjacent to the at least one first portion 53a. For example, each of the two or more second portions 53b disposed at the bendable region may include a cross-sectional surface in which a side surface thereof has a concave hexagonal shape. The first portion 53a of the bending region may include a protrusion portion which protrudes toward a concave portion of the second portion 53b adjacent thereto. For example, the second portion 53b of the bendable region may include a cross-sectional surface in which a side surface thereof has a concave hexagonal shape.

According to an embodiment of the present disclosure, the bendable region may include three second portions. For example, in each of the two or more second portions 53b disposed at the bendable region, a first surface and a second surface thereof may have the same width. For example, each of the two or more second portions 53b disposed at the bendable region may include a first side surface and a second side surface that are parallel between the first surface and the second surface, and a shortest distance between the first side surface and the second side surface may be smaller than a width of the first surface. For example, in one of the two or more second portions 53b disposed in the bendable region, a first side surface and a second side surface may contact each other.

According to an embodiment of the present disclosure, the second portion 53b of the second sound-generating apparatus 53 may be disposed to correspond to a center portion of the bendable region. For example, a second portion 53b, corresponding to a center portion of three second portions 53b in the bendable region, may be a portion on which a stress may concentrate. Therefore, a portion on which a stress may concentrate may have a shape that differs from a portion on which a stress may concentrate less. For example, a second portion 53b, disposed at a center portion, of the bendable region may have a shape that differs from the other second portion 53b of the bending region. For example, the second portion 53b, corresponding to the center portion of the three second portions 53b in the bendable region, may have a cross-sectional shape that differs from each of the other second portion 53b at both sides. Accordingly, the second sound-generating apparatus 53 may not be broken by the second portion 53b corresponding to the center portion of the bending region. Thus, the reliability of the second sound-generating apparatus 53 may be secured.

The second sound-generating apparatus 53 may be disposed in an area of about 30% to about 70% with respect to a total area including a first region, a second region, and a third region. The third region may be a bendable region that may be bendable from the first region and the second region. For example, an area where the second sound-generating apparatus 53 is disposed may vary based on a curvature radius of the bendable region. For example, when a curvature radius R of the bending region is 100 R or less, the second sound-generating apparatus 53 may be disposed in an area of about 50% to about 70%. For example, when the curvature radius R of the bending region is 100 R or more, the second sound-generating apparatus 53 may be disposed in an area of about 30% to about 50%.

With reference to the example of FIG. 5, a modulus of a second portion disposed in one of first to third regions may be different from a modulus of a second portion disposed in the other region. For example, a modulus of a second portion 61b of a first sound-generating apparatus 61 may be different from a modulus of a second portion 63b of a second sound-generating apparatus 63. For example, a modulus of the second portion 61b of the first sound-generating apparatus 61 may be configured to be higher than a modulus of the second portion 63b of the second sound-generating apparatus 63. For example, the second portion 61b of the first sound-generating apparatus 61 may be an epoxy composite material having a high modulus. For example, the second portion 63b of the second sound-generating apparatus 63 may be an epoxy composite material to which a filler or epoxy having a low modulus may be added. For example, a modulus of the second portion 61b of the first sound-generating apparatus 61 may be $10^9$ pascals (Pa), e.g., 1 GPa. For example, a modulus of the second portion 63b of the second sound-generating apparatus 63 may be $10^7$ Pa, e.g., 0.01 GPa.

A modulus of a second portion 65b of a third sound-generating apparatus 65 may be different from a modulus of the second portion 63b of the second sound-generating apparatus 63. For example, a modulus of the second portion 65b of the third sound-generating apparatus 65 may be configured to be higher than a modulus of the second portion 63b of the second sound-generating apparatus 63. For example, a modulus of the second portion 65b of the third sound-generating apparatus 65 may be $10^9$ Pa, e.g., 1 GPa. For example, a modulus of the second portion 63b of the second sound-generating apparatus 63 may be $10^7$ Pa, e.g., 0.01 GPa. According to an embodiment of the present disclosure, a modulus of the second portion 61b of the first sound-generating apparatus 61 may be configured to be equal to a modulus of the second portion 65b of the third sound-generating apparatus 65.

With reference to the example of FIG. 6, widths of each of the first to third regions may be different from each other. One of the first to third regions may have a width that is wider than the other regions. For example, the third region may have a width that is wider than each of the first region and the second region.

A width of a second portion 71b of a first sound-generating apparatus 71 may be different from a width of a second portion 73b of a second sound-generating apparatus 73. For example, a width of the second portion 73b of the second sound-generating apparatus 73 may be wider than a width of the second portion 71b of the first sound-generating apparatus 71. For example, a width of the second portion 73b of the second sound-generating apparatus 73 may be configured to about 1.5 to 3 times a width of the second portion 71b of the first sound-generating apparatus 71, but embodiments of the present disclosure are limited thereto.

A width of a second portion 75b of a third sound-generating apparatus 75 may be different from a width of the second portion 73b of the second sound-generating apparatus 73. For example, a width of the second portion 73b of the second sound-generating apparatus 73 may be configured to be wider than a width of the second portion 75b of the third sound-generating apparatus 75. For example, a width of the second portion 73b of the second sound-generating apparatus 73 may be adjusted to be about 1.5 to 3 times a width of the second portion 75b of the third sound-generating apparatus 75, but embodiments of the present disclosure are limited thereto. For example, a width of the second portion 71b of the first sound-generating apparatus 71 may be equal to a width of the second portion 75b of the third sound-generating apparatus 75.

A width of the second portion 73b of the second sound-generating apparatus 73 may be different from each other. For example, a width of the second portion 73b of the second sound-generating apparatus 73 may differ from a width of the first portion 73a. A width of the second portion 71b of the first sound-generating apparatus 71 may be the same. For example, a width of the first portion 71a of the first sound-generating apparatus 71 may be the same. A width of the second portion 75b of the third sound-generating apparatus 75 may be the same. For example, a width of the first portion 75a of the third sound-generating apparatus 75 may be the same.

According to another embodiment of the present disclosure, a width of the first portion 71a of the first sound-generating apparatus 71 may be different from a width of the first portion 71b of the second sound-generating apparatus 73. For example, a width of the first portion 73a of the second sound-generating apparatus 73 may be wider than a width of the first portion 71a of the first sound-generating apparatus 71. For example, a width of the first portion 73a of the second sound-generating apparatus 73 may be adjusted to be about 1.5 to 3 times a width of the first portion 71a of the first sound-generating apparatus 71, but embodiments of the present disclosure are not limited thereto.

A width of the first portion 75a of the third sound-generating apparatus 75 may be different from a width of the first portion 73a of the second sound-generating apparatus 73. For example, a width of the first portion 73a of the second sound-generating apparatus 73 may be wider than a width of the second portion 75b of the third sound-generating apparatus 75. For example, a width of the second portion 73b of the second sound-generating apparatus 73 may be configured to be about 1.5 to 3 times a width of the first portion 75a of the third sound-generating apparatus 75, but embodiments of the present disclosure are not limited thereto. For example, a width of the first portion 71a of the first sound-generating apparatus 71 may be configured to be equal to a width of the first portion 75a of the third sound-generating apparatus 75.

According to an embodiment of the present disclosure, a width and/or an interval of a second portion of a sound-generating apparatus may be differently adjusted in a vehicle or an apparatus including a bendable region. Thus, a sound-generating apparatus may be easily disposed at the bendable region, thereby providing a sound-generating apparatus in which the stability of a curved portion may be secured.

According to an embodiment of the present disclosure, a width and/or a modulus of a sound-generating apparatus disposed at a bendable region may be differently adjusted, or a shape of a second portion may be differently configured. Thus, a sound-generating apparatus may be easily disposed based on a shape of the bendable region, thereby providing a vehicle or an apparatus having enhanced reliability.

Figure 7A:
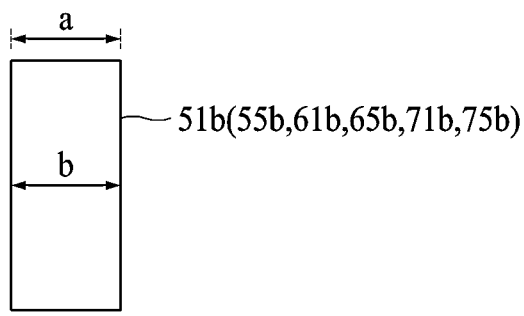
FIGS. 7A to 7C illustrate a sound-generating apparatus according to another embodiment of the present disclosure.
Figure 7B:
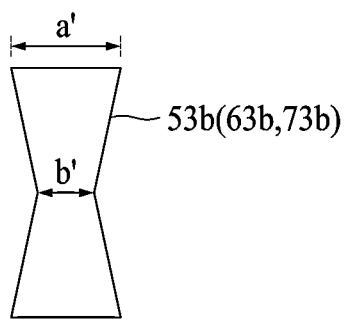
Figure 7C:
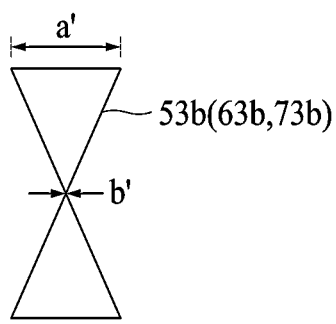

FIGS. 7A to 7C illustrate a sound-generating apparatus according to another embodiment of the present disclosure.

FIGS. 7A to 7C illustrate a shape of a second portion of the sound-generating apparatus. With reference to the example of FIG. 7A, second portions 51b, 55b, 61b, 65b, 71b, and 75b may have a first width 'a' and a second width 'b'. The second width 'b' may be a width of a portion that is ½ of a height of the second portions 51b, 55b, 61b, 65b, 71b, and 75b. The second width 'b' may be a width of a portion that is half of a height of the second portions 51b, 55b, 61b, 65b, 71b, and 75b. The first width 'a' may be the same as the second width 'b'. For example, a ratio of the second width b to the first width a may be 1. For example, the second width 'b' divided by the first width 'a' may equal 1. For example, the second portions 51b, 55b, 61b, 65b, 71b, and 75b may each include a first surface, and a second surface opposite to the first surface. A length or a width of the first surface may be the same as a length or a width of the second surface. For example, the second portions 51b, 55b, 61b, 65b, 71b, and 75b may be applied to the first sound-generating apparatuses 51, 61, and 71 and the third sound-generating apparatuses 55, 65, and 75, described above with reference to the examples of FIGS. 3A to 6. For example, a height or a thickness of a sound-generating apparatus may be 100 μm to 200 μm, but embodiments of the present disclosure are not limited thereto.

With reference to the example of FIG. 7B, second portions 53b, 63b, and 73b may have a first width a' and a second width b'. The second width b' may be a width of a portion that is ½ of a height of the second portions 53b, 63b, and 73b. For example, a ratio of the second width b' to the first width a' may be 0.8. For example, the second width b' divided by the first width a' may be 0.8. For example, the first width a' may be 30 μm to 500 μm, but embodiments of the present disclosure are not limited thereto. For example, a height or a thickness of a sound-generating apparatus may be 100 μm to 200 μm, but embodiments of the present disclosure are not limited thereto.

According to an embodiments of the present disclosure, two or more second portions 53b, 63b, and 73b, disposed in a bendable region, may each have the first width a' and the second width b', and a shortest distance between a first side surface and a second side surface having the second width b' may be smaller than the first width a'. For example, in one of the two or more second portions 53b, 63b, and 73b disposed at the bendable region, a first side surface and a second side surface may contact each other. For example, each of the second portions 53b, 63b, and 73b may include a first surface, and a second surface opposite to the first surface. A length or a width of the first surface may differ from the second surface. For example, the length or width of the first surface divided by the length or width of the second surface may be 0 to 0.8.

According to an embodiments of the present disclosure, the second portions 53b, 63b, and 73b may be applied to the second sound-generating apparatuses 53, 63, and 73 described above with reference to the examples of FIGS. 3A to 6. For example, the second portions 53b, 63b, and 73b may be disposed in the bendable region of the second sound-generating apparatuses 53, 63, and 73 described above with reference to the examples of FIGS. 3A to 6. For example, the second portions 53b, 63b, and 73b may be applied to the second portions 53b, 63b, and 73b at both sides of a center of three second portions 53b, 63b, and 73b in the second sound-generating apparatuses 53, 63, and 73 described above with reference to the examples of FIGS. 3A to 6.

With reference to the example of FIG. 7C, second portions 53b, 63b, and 73b may have a first width a' and a second width b'. The second width b' may be a width of a portion which is ½ of a height of the second portions 53b, 63b, and 73b. For example, a ratio of the second width b' to the first width a' may be 0. For example, the second width b' divided by the first width a' may be 0.

According to an embodiments of the present disclosure, two or more second portions 53b, 63b, and 73b, disposed in a bendable region, may each have the first width a' and the second width b', and a shortest distance between a first side surface and a second side surface having the second width b' may be smaller than the first width a'. For example, in one of the two or more second portions 53b, 63b, and 73b disposed at the bendable region, a first side surface and a second side surface may contact each other. For example, each of the second portions 53b, 63b, and 73b may include a first surface, and a second surface opposite to the first surface. A length or a width of the first surface may differ from the second surface. For example, the length or width of the first surface divided by the length or width of the second surface may be 0 to 0.8.

According to an embodiments of the present disclosure, the second portions 53b, 63b, and 73b may be applied to the second sound-generating apparatuses 53, 63, and 73 described above with reference to the examples of FIGS. 3A to 6. For example, the second portions 53b, 63b, and 73b may be disposed in the bendable region of the second sound-generating apparatuses 53, 63, and 73 described above with reference to the examples of FIGS. 3A to 6. For example, the second portions 53b, 63b, and 73b may be applied to the second portions 53b, 63b, and 73b, disposed at a center or a center portion of three second portions 53b, 63b, and 73b, in the second sound-generating apparatuses 53, 63, and 73 described above with reference to the examples of FIGS. 3A to 6.

According to an embodiment of the present disclosure, a vertical length and/or width of a second portion of a sound-generating apparatus may be differently adjusted in a vehicle or an apparatus including a bendable region. Thus, a sound-generating apparatus may be easily disposed at the bendable region, thereby providing a sound-generating apparatus in which the stability of a curved portion may be secured.

According to an embodiment of the present disclosure, a shape of a second portion of a sound-generating apparatus may be differently configured in a vehicle or an apparatus including a bendable region. Thus, a sound-generating apparatus may be easily disposed in the bendable region, thereby providing a vehicle or an apparatus having enhanced reliability.

Figure 8A:
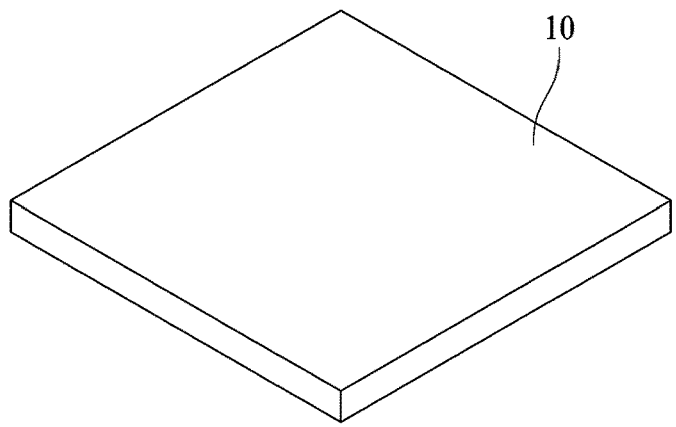
FIGS. 8A to 8C illustrate a method of manufacturing a sound-generating apparatus according to an embodiment of the present disclosure.
Figure 8B:
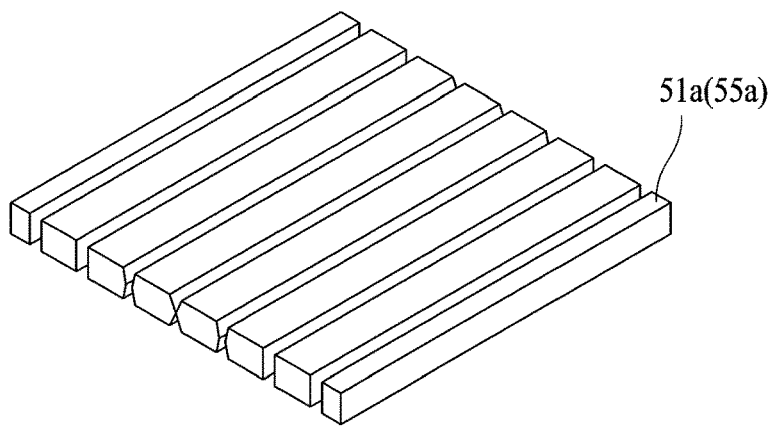
Figure 8C:
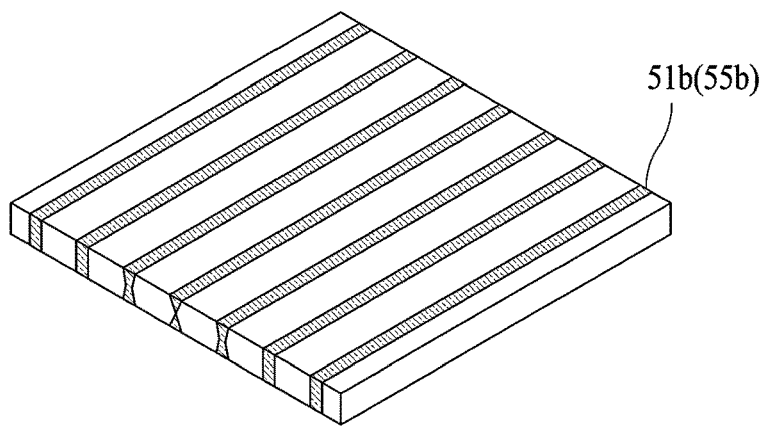

FIGS. 8A to 8C illustrate a method of manufacturing a sound-generating apparatus according to an embodiment of the present disclosure.

With reference to the examples of FIGS. 8A and 8B, first portions 51a and 55a may be formed by a dicing process, e.g., performed at a plate 10. The plate 10 may be a ceramic piezoelectric plate. In the dicing process, a sound-generating apparatus may be diced so that a width of an upper surface thereof in a bent direction is wider than a lower surface thereof. With reference to the example of FIG. 8C, a second portion may be filled between adjacent first portions. For example, more second portions 51b and 55b than first portions 51a and 55a may be filled into a portion on which a stress caused by bending may concentrate. Therefore, an interval between the first portions 51a and 55a and the second portions 51b and 55b may be adjusted, or the second portions 51b and 55b, where a modulus thereof is small, may be filled. Accordingly, a filled shape or volume of the second portions 51b and 55b may be changed based on a vehicle or an apparatus, including a bendable region. Thus, the reliability of a sound-generating apparatus disposed in the bendable region may be enhanced.

Figure 9:
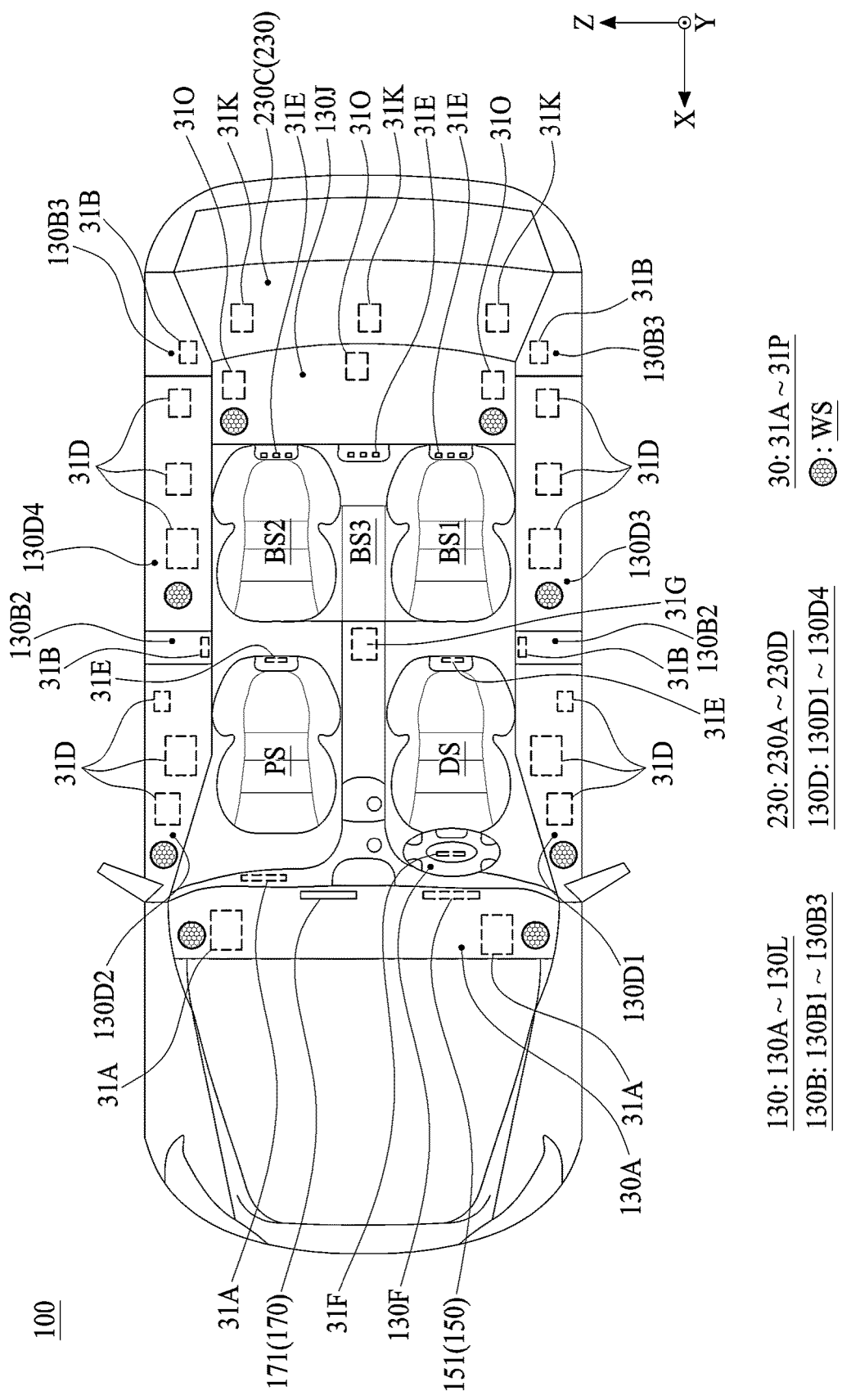
FIG. 9 illustrates a vehicle according to an embodiment of the present disclosure.
Figure 10:
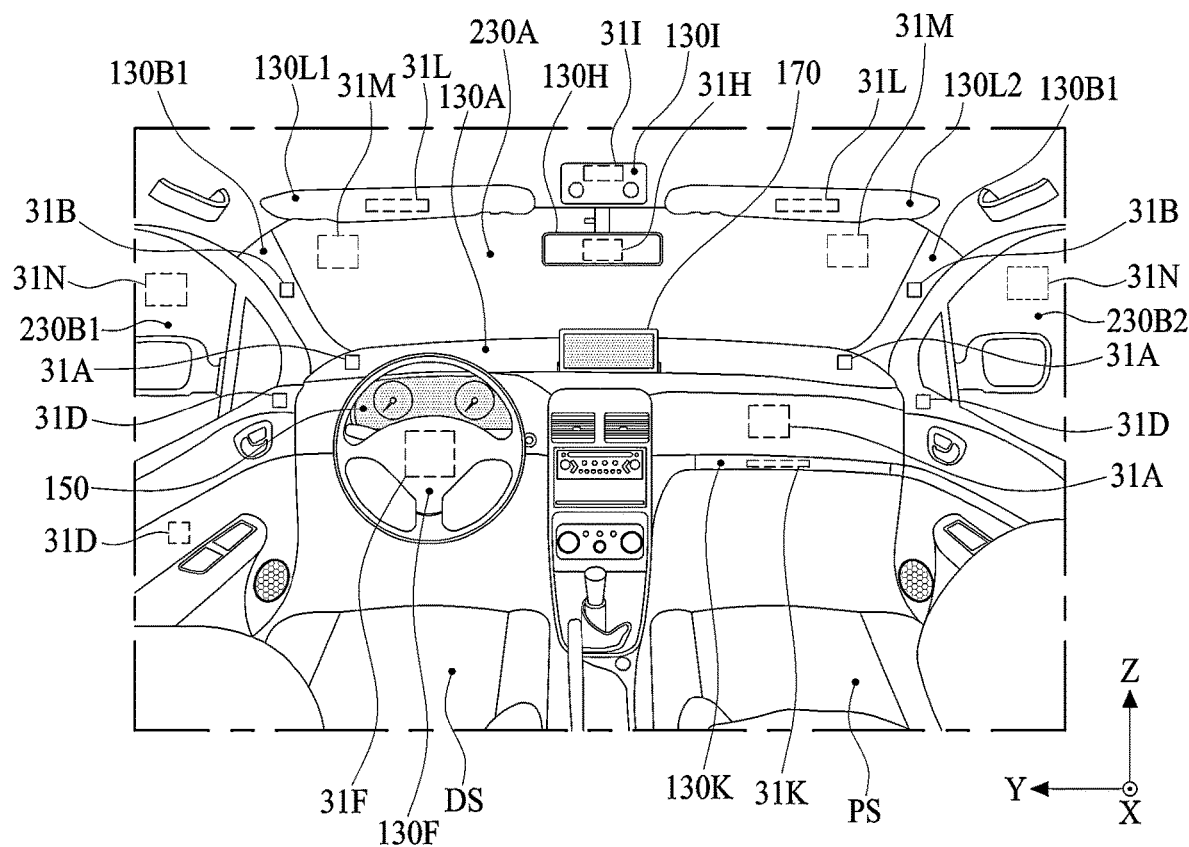
FIG. 10 illustrates a vehicle according to an embodiment of the present disclosure.
Figure 11:
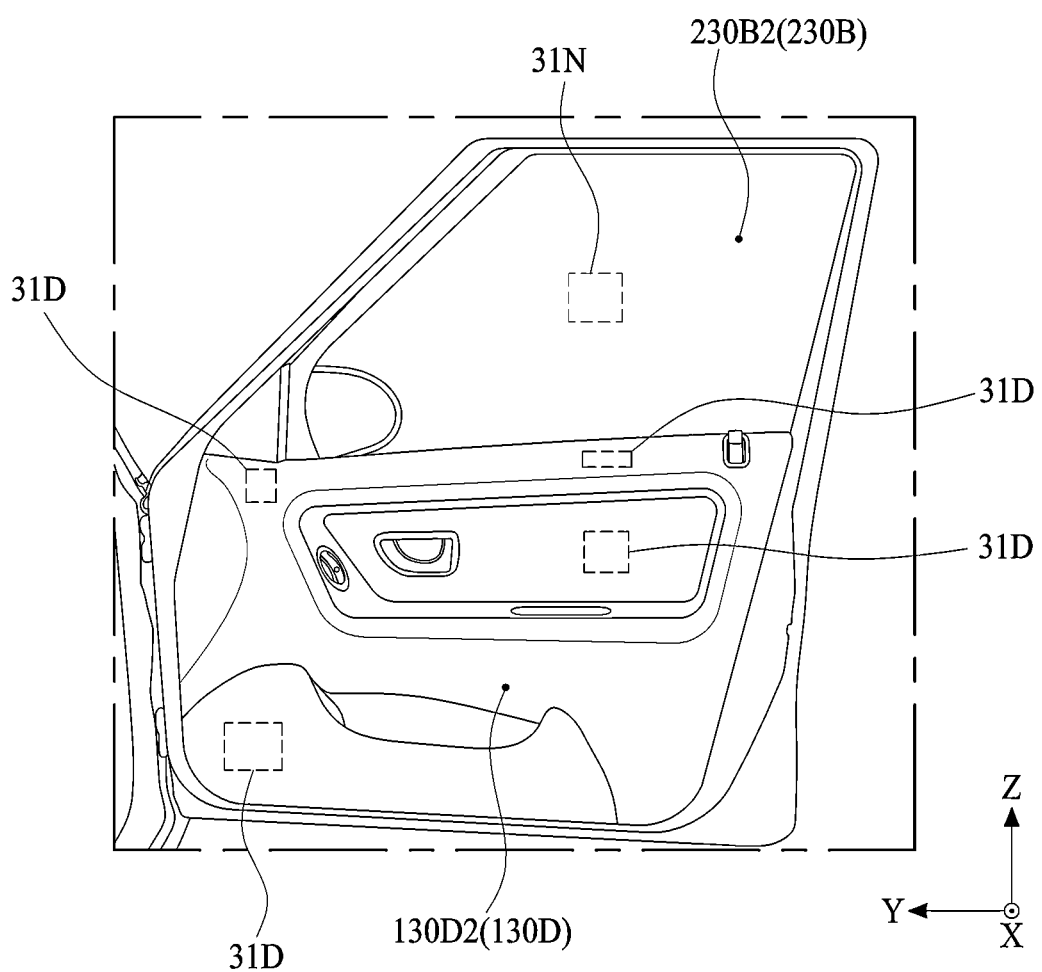
FIG. 11 illustrates a vehicle according to an embodiment of the present disclosure.
Figure 12:
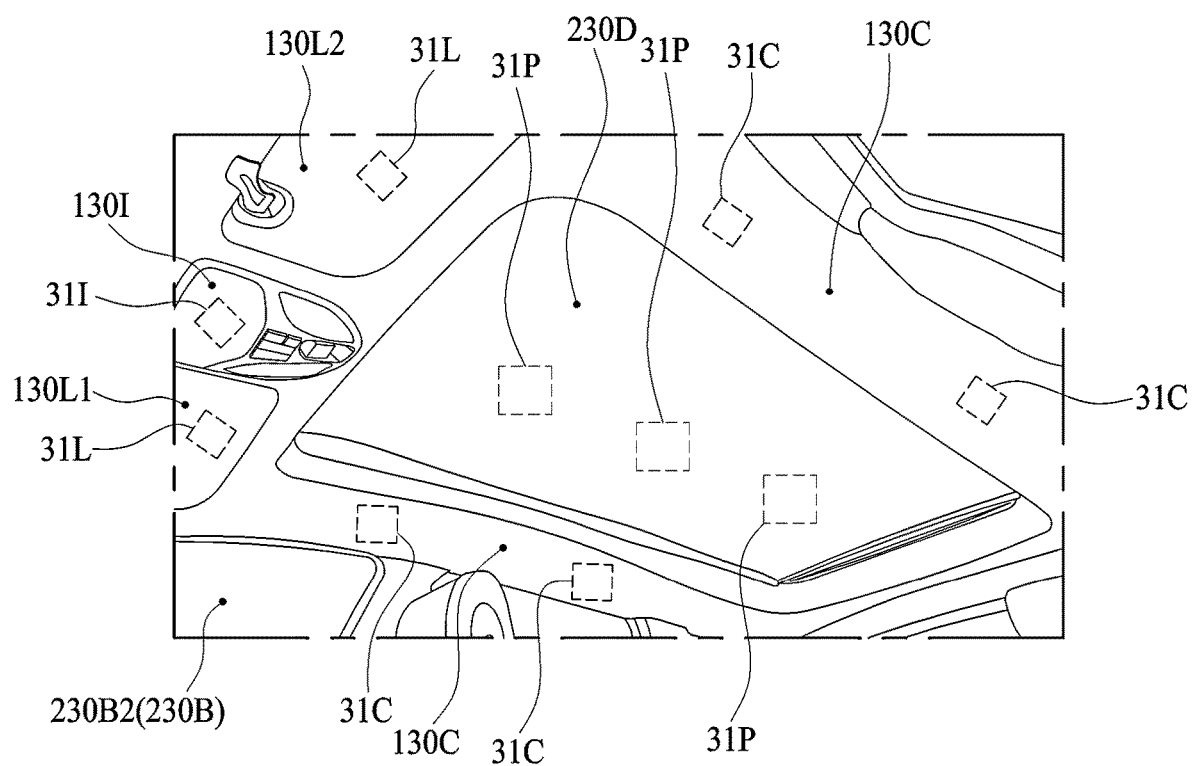
FIG. 12 illustrates a vehicle according to an embodiment of the present disclosure.
Figure 13:
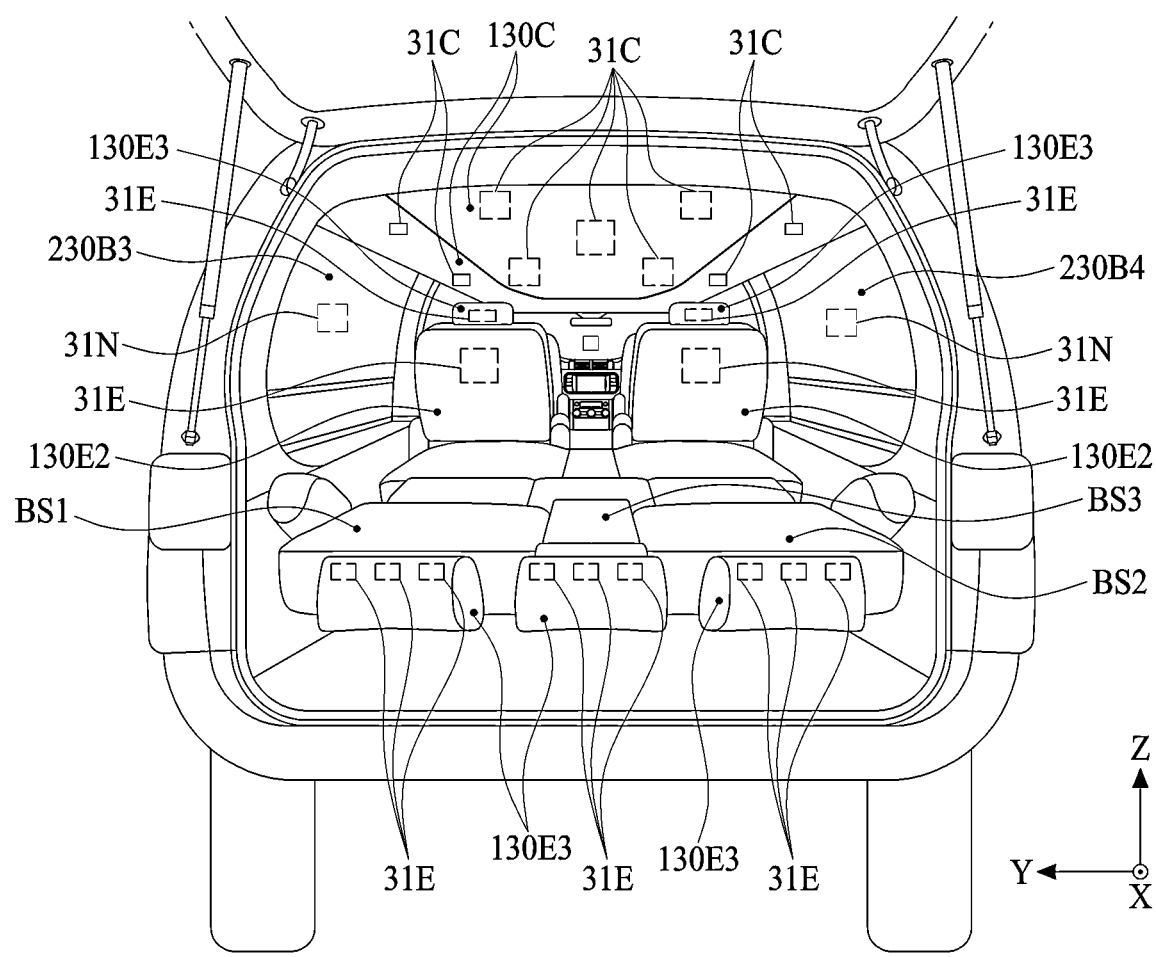
FIG. 13 illustrates a vehicle according to an embodiment of the present disclosure.

FIG. 9 illustrates a vehicle according to an embodiment of the present disclosure. FIG. 10 illustrates a vehicle according to an embodiment of the present disclosure. FIG. 11 illustrates a vehicle according to an embodiment of the present disclosure. FIG. 12 illustrates a vehicle according to an embodiment of the present disclosure. FIG. 13 illustrates a vehicle according to an embodiment of the present disclosure.

FIG. 10 illustrates a vibration apparatus disposed near a driver seat and an occupant seat of the example of FIG. 9. FIG. 11 illustrates a vibration apparatus disposed at a door and a glass window of the example of FIG. 9. FIG. 12 illustrates a vibration apparatus disposed at a roof of a vehicle of the example of FIG. 9. FIG. 13 illustrates a vibration apparatus disposed at a roof and a seat of the vehicle of the example of FIG. 9.

With reference to the examples of FIGS. 1 and 9 to 13, a vehicle 100, according to an embodiment of the present disclosure, may include a vehicle interior material 130 and a vibration apparatus 30. The vehicle interior material 130 may cover a vehicle structure, and may be exposed at an indoor space of the vehicle 100.

The vehicle interior material 130 may include a vibration region including a curved portion. The vibration region may further include a peripheral portion. The peripheral portion may be connected to the curved portion, and may have a non-curve shape. The vibration apparatus 30 may be disposed in the vibration region. For example, one of first to third regions of a sound-generating apparatus may be disposed at the curved portion of the vibration region. For example, one of the first to third regions of the sound-generating apparatus illustrated in the examples of FIGS. 3A to 7C may be disposed at the curved portion of the vibration region. For example, one of the first to third regions of the sound-generating apparatus may be disposed in the curved portion of the vibration region. The other region of the first to third regions of the sound-generating apparatus may be disposed at the curved portion of the vibration region. For example, the other region of the first to third regions of the sound-generating apparatus illustrated in FIGS. 3A to 7C may be disposed at the peripheral portion of the vibration region.

The vehicle interior material 130 may include one or more of: a dashboard 130A, a pillar interior material 130B, a roof interior material 130C, a door interior material 130D, a seat interior material 130E, a handle interior material 130F, and a floor interior material 130G. The vibration apparatus 30 may be disposed at a vibration region of one or more of: the dashboard 130A, the pillar interior material 130B, the roof interior material 130C, the door interior material 130D, the seat interior material 130E, the handle interior material 130F, and the floor interior material 130G. For example, the vibration apparatus 30 may include one or more sound-generating apparatuses 31A to 31G, which may be disposed at one or more of: the dashboard 130A, the pillar interior material 130B, the roof interior material 130C, the door interior material 130D, the seat interior material 130E, the handle interior material 130F, and the floor interior material 130G. For example, the vibration apparatus 30 may include one or more of first to seventh sound-generating apparatuses 31A to 31G, and thus, may output sounds of one or more channels (e.g., single or multichannel). For example, one or more of the first to seventh sound-generating apparatuses 31A to 31G may be configured with the sound-generating apparatus illustrated in FIGS. 3A to 7C. The dashboard 130A may include a bendable region. The first sound-generating apparatuses 51, 61, and 71, the second sound-generating apparatuses 53, 63, and 73, and the third sound-generating apparatuses 55, 65, and 75 of FIGS. 3A to 7C may be disposed at the dashboard 130A.

With reference to the examples of FIGS. 1, 9, and 10, a sound-generating apparatus 31A to 31P, according to an embodiment of the present disclosure, may be disposed between a dash panel and the dashboard 130A of a main frame of a vehicle structure. The sound-generating apparatus 31A to 31P may vibrate the dashboard 130A to output sound based on a vibration of the dashboard 130A. For example, the sound-generating apparatus 31A to 31P may directly vibrate the dashboard 130A to output sound based on a vibration of the dashboard 130A. For example, the first sound-generating apparatus 31A may include a film-type sound generator. For example, the first sound-generating apparatus 31A may include one or more of the first to third sound-generating apparatuses described above with reference to the examples of FIGS. 3A to 7C. For example, the first sound-generating apparatus 31A may be a dashboard speaker.

According to an embodiment of the present disclosure, each of the dash panel and the dashboard 130A may include a first region corresponding to a driver seat DS, a second region corresponding to a passenger seat PS, and a third region (e.g., a center region) between the first region and the second region. Each of the dash panel and the dashboard 130A may include a fourth region, which may be inclined to face the passenger seat PS. According to an embodiment of the present disclosure, the first sound-generating apparatus 31A may be disposed to vibrate one or more of the first to fourth regions of the dashboard 130A. For example, the first sound-generating apparatus 31A may be disposed at each of the first and second regions of the dashboard 130A, or may be disposed at one or more of the first to fourth regions. For example, the first sound-generating apparatus 31A may be configured to output sound having a frequency of 150 Hz to 20 kHz, but embodiments of the present disclosure are not limited thereto. For example, the first sound-generating apparatus 31A, configured to vibrate one or more of the first to fourth regions of the dashboard 130A, may have the same or different sound output characteristics. For example, the first to third sound-generating apparatuses described above with reference to the examples of FIGS. 3A to 7C may be disposed in one or more of the first to fourth regions of the dashboard 130A.

The second sound-generating apparatus 31B, according to an embodiment of the present disclosure, may be disposed between the pillar interior material 130B and a pillar panel of the main frame of the vehicle structure. The second sound-generating apparatus 31B may vibrate the pillar interior material 130B to output sound based on a vibration of the pillar interior material 130B. For example, the second sound-generating apparatus 31B may directly vibrate the pillar interior material 130B to output sound based on a vibration of the pillar interior material 130B. For example, the second sound-generating apparatus 31B may include a film-type sound generator. For example, the second sound-generating apparatus 31B may include one of more of the first to third sound-generating apparatuses described above with reference to the examples of FIGS. 3A to 7C. For example, the second sound-generating apparatus 31B may be a pillar speaker or a tweeter speaker.

According to an embodiment of the present disclosure, the pillar panel may include a first pillar (e.g., an 'A' pillar) disposed at both sides of a front glass window, a second pillar (e.g., a 'B' pillar) disposed at both sides of a center of a vehicle body, and a third pillar (e.g., a 'C' pillar) disposed at both sides of a rear portion of the vehicle body. The pillar interior material 130B may include a first pillar interior material 130B1 covering the first pillar, a second pillar interior material 130B2 covering the second pillar, and a third pillar interior material 130B3 covering the third pillar. According to an embodiment of the present disclosure, the second sound-generating apparatus 31B may be disposed at one or more of: a region between the first pillar and the first pillar interior material 130B1, a region between the second pillar and the second pillar interior material 130B2, and a region between the third pillar and the third pillar interior material 130B3. Thus, the second sound-generating apparatus 31B may vibrate one or more of the first to third pillar interior materials 130B1 to 130B3. For example, the second sound-generating apparatus 31B may be configured to output sound at about 2 kHz to about 20 kHz, but embodiments of the present disclosure are not limited thereto. For example, the second sound-generating apparatus 31B may be configured to output sound at about 150 Hz to about 20 kHz. For example, the second sound-generating apparatus 31B, configured to vibrate one or more of the first to third pillar interior materials 130B1 to 130B3, may have the same sound output characteristic or different sound output characteristics. For example, the second sound-generating apparatus 31B may include a film-type sound generator. For example, the second sound-generating apparatus 31B may include one of more of the first to third sound-generating apparatuses described above with reference to the examples of FIGS. 3A to 7C.

With reference to the examples of FIGS. 1, 12, and 13, the third sound-generating apparatus 31C, according to an embodiment of the present disclosure, may be disposed between the roof interior material 130C and a roof panel of the main frame of the vehicle structure. The third sound-generating apparatus 31C may vibrate the roof interior material 130C to output sound based on a vibration of the roof interior material 130C. For example, the third sound-generating apparatus 31C may directly vibrate the roof interior material 130C to output sound based on a vibration of the roof interior material 130C. For example, the third sound-generating apparatus 31C may include a film-type sound generator or a coil-type sound generator. For example, the third sound-generating apparatus 31C may include one or more of the first to third sound-generating apparatuses described above with reference to the examples of FIGS. 3A to 7C. For example, the third sound-generating apparatus 31C may be a roof speaker.

According to an embodiment of the present disclosure, each of the roof panel and the roof interior material 130C covering the roof panel may include the first region corresponding to the driver seat DS, the second region corresponding to the passenger seat PS, a third region corresponding to a region between the driver seat DS and the passenger seat PS, a fourth region corresponding to a first rear seat BS1 behind the driver seat DS, a fifth region corresponding to a second rear seat BS2 behind the passenger seat PS, a sixth region corresponding to a region between the first rear seat BS1 and the second rear seat BS2, and a seventh region between the third region and the sixth region. For example, the third sound-generating apparatus 31C may be disposed to vibrate one or more of the first to seventh regions of the roof interior material 130C. For example, the third sound-generating apparatus 31C may be configured to output sound of about 150 Hz to about 20 kHz, but embodiments of the present disclosure are not limited thereto. For example, the third sound-generating apparatus 31C, configured to vibrate one or more of the first to seventh regions of the roof interior material 130C, may have the same sound output characteristic or different sound output characteristics. For example, the third sound-generating apparatus 31C, configured to vibrate each of the first to seventh regions of the roof interior material 130C, may have the same sound output characteristic or different sound output characteristics. For example, some of the third sound-generating apparatuses 31C, configured to vibrate one or more of the first to seventh regions of the roof interior material 130C, may be configured to output sound of about 2 kHz to about 20 kHz, and the other third sound-generating apparatuses 31C may be configured to output sound at about 150 Hz to about 20 kHz, but embodiments of the present disclosure are not limited thereto.

With reference to the examples of FIGS. 1, and 9 to 11, the fourth sound-generating apparatus 31D, according to an embodiment of the present disclosure, may be disposed between the door interior material 130D and a door frame of the vehicle structure. The fourth sound-generating apparatus 31D may vibrate the door interior material 130D to output sound based on a vibration of the door interior material 130D. For example, the fourth sound-generating apparatus 31D may directly vibrate the door interior material 130D to output sound based on a vibration of the door interior material 130D. According to an embodiment of the present disclosure, the fourth sound-generating apparatus 31D may be a film-type sound generator. For example, the fourth sound-generating apparatus 31D may include one or more of the first to third sound-generating apparatuses described above with reference to the examples of FIGS. 3A to 7C. For example, the fourth sound-generating apparatus 31D may be a door speaker.

According to an embodiment of the present disclosure, each of the door frame and the door interior material 130D may include an upper region, a middle region, and a lower region with respect to a height direction Z of the vehicle 100. For example, the fourth sound-generating apparatus 31D may be disposed at one or more of an upper region, a middle region, and a lower region between the door frame and the door interior material 130D, and thus, may vibrate one or more of an upper region, a middle region, and a lower region of the door interior material 130D. For example, one or more of the first to third sound-generating apparatuses described above with reference to the examples of FIGS. 3A to 7C may be disposed at one or more of an upper region, a middle region, and a lower region between the door frame and the door interior material 130D, and thus, may vibrate one or more of an upper region, a middle region, and a lower region of the door interior material 130D.

According to an embodiment of the present disclosure, the upper region of the door interior material 130D may have a relatively small curvature radius. The fourth sound-generating apparatus 31D, configured to vibrate the upper region of the door interior material 130D, may include one or more of the first to third sound-generating apparatuses described above with reference to the examples of FIGS. 3A to 7C.

According to an embodiment of the present disclosure, the door frame may include a first door frame (e.g., a left front door frame), a second door frame (e.g., a right front door frame), a third door frame (e.g., a left rear door frame), and a fourth door frame (e.g., a right rear door frame). According to an embodiment of the present disclosure, the door interior material 130D may include a first door interior material (e.g., a left front door interior material) 130D1 covering the first door frame, a second door interior material (e.g., a right front door interior material) 130D2 covering the second door frame, a third door interior material (e.g., a left rear door interior material) 130D3 covering the third door frame, and a fourth door interior material (e.g., a right rear door interior material) 130D4 covering the fourth door frame. For example, the fourth sound-generating apparatus 31D may be disposed at one or more of an upper region, a middle region, and a lower region between each of the first to fourth door frames and the first to fourth door interior materials 130D1 to 130D4. For example, the fourth sound-generating apparatus 31D may vibrate one or more of an upper region, a middle region, and a lower region of each of the first to fourth door interior materials 130D1 to 130D4. It should be appreciated that the terms "left" and "right" are used herein for convenience of explanation and are non-limiting in relative orientation.

According to an embodiment of the present disclosure, the fourth sound-generating apparatus 31D, configured to vibrate the upper regions of one or more of the first to fourth door interior materials 130D1 to 130D4, may be configured to output sound of about 2 kHz to about 20 kHz, or may be configured to output sound of about 150 Hz to about 20 kHz, but embodiments of the present disclosure are not limited thereto. According to an embodiment of the present disclosure, the fourth sound-generating apparatus 31D, configured to vibrate the middle regions and the lower regions of one or more of the first to fourth door interior materials 130D1 to 130D4, may be configured to output sound of about 150 Hz to about 20 kHz, but embodiments of the present disclosure are not limited thereto. For example, the fourth sound-generating apparatus 31D, configured to vibrate the middle regions and the lower regions of one or more of the first to fourth door interior materials 130D1 to 130D4, may be any one of a woofer, a mid-woofer, and a sub-woofer.

Sounds, which may be respectively output from the fourth sound-generating apparatus 31D, disposed at the first door interior material 130D1, and the fourth sound-generating apparatus 31D, disposed at the second door interior material 130D2, may be combined and output. Also, sound output from the fourth sound-generating apparatus 31D, disposed at the third door interior material 130D3, and sound output from the fourth sound-generating apparatus 31D, disposed at the fourth door interior material 130D4, may be combined and output.

According to an embodiment of the present disclosure, an upper region of each of the first to fourth door interior materials 130D1 to 130D4 may include a first upper region adjacent to the dashboard 130A, a second upper region adjacent to the rear seats BS1 to BS3, and a third upper region between the first upper region and the second upper region. For example, the fourth sound-generating apparatus 31D may be disposed at one or more of the first to third upper regions of each of the first to fourth door interior materials 130D1 to 130D4. For example, the fourth sound-generating apparatus 31D may be disposed at the first upper region of each of the first and second door interior materials 130D1 and 130D2, and may be disposed at one or more of the second and third upper regions of each of the first and second door interior materials 130D1 and 130D2. For example, the fourth sound-generating apparatus 31D, configured to vibrate the first upper regions of one or more of the first and second door interior materials 130D1 and 130D2, may be configured to output sound of about 2 kHz to about 20 kHz, but embodiments of the present disclosure are not limited thereto. The fourth sound-generating apparatus 31D, configured to vibrate one or more of the second and third upper regions of each of the first and second door interior materials 130D1 and 130D2, may be configured to output sound of about 2 kHz to about 20 kHz, or may be configured to output sound of about 150 Hz to about 20 kHz, but embodiments of the present disclosure are not limited thereto.

With reference to the examples of FIGS. 1, 9, and 13, the fifth sound-generating apparatus 31E, according to an embodiment of the present disclosure, may be disposed between a seat frame and the seat interior material 130E, and may vibrate the seat interior material 130E to output sound based on a vibration of the seat interior material 130E. For example, the fifth sound-generating apparatus 31E may directly vibrate the seat interior material 130E to output sound based on a vibration of the seat interior material 130E. According to an embodiment of the present disclosure, the fifth sound-generating apparatus 31E may include a film-type sound generator or a coil-type sound generator. For example, the fifth sound-generating apparatus 31E may include one or more of the first to third sound-generating apparatuses described above with reference to the examples of FIGS. 3A to 7C. For example, the fifth sound-generating apparatus 31E may be a seat speaker or a headrest speaker.

According to an embodiment of the present disclosure, the seat frame may include a first seat frame (e.g., a driver seat frame), a second seat frame (e.g., a passenger seat frame), a third seat frame (e.g., a first rear seat frame), a fourth seat frame (e.g., a second rear seat frame), and a fifth seat frame (e.g., a third rear seat frame). According to an embodiment of the present disclosure, the first seat interior material may surround the first seat frame, the second seat interior material may surround the second seat frame, the third seat interior material may surround the third seat frame, the fourth seat interior material may surround the fourth seat frame, and the fifth seat interior material may surround the fifth seat frame.

According to an embodiment of the present disclosure, each of the first to fifth seat frames may include a seat bottom frame, a seat back frame, and a headrest frame. The seat interior material 130E may include a seat bottom interior material 130E1 surrounding the seat bottom frame, a seat back interior material 130E2 surrounding the seat back frame, and a headrest interior material 130E3 surrounding the headrest frame. Each of the seat bottom interior material 130E1, the seat back interior material 130E2, and the headrest interior material 130E3 may include an inner interior material and an outer interior material. The inner interior material may include a foam layer. The outer interior material may include a surface layer, including a fiber or a leather. The outer interior material may further include a base layer, including a plastic material that supports the surface layer.

According to an embodiment of the present disclosure, the fifth sound-generating apparatus 31E may be disposed at one or more of: a region between the seat back frame and the seat back interior material 130E2, and a region between the headrest frame and the headrest interior material 130E3. Thus, the fifth sound-generating apparatus 31E may vibrate one or more of the outer interior material of the seat back interior material 130E2 and the outer interior material of the headrest interior material 130E3.

According to an embodiment of the present disclosure, the fifth sound-generating apparatus 31E, disposed at each of the driver seat DS and the passenger seat PS, may be disposed at one or more of the region between the seat back frame and the seat back interior material 130E2 and the region between the headrest frame and the headrest interior material 130E3. According to an embodiment of the present disclosure, the fifth sound-generating apparatus 31E disposed at one or more of the first to third rear seats BS1 to BS3 may be disposed between the headrest frame and the headrest interior material 130E3. For example, one or more of the first to third rear seats BS1 to BS3 may include one or more fifth sound-generating apparatuses 31E disposed between the headrest frame and the headrest interior material 130E3. For example, the one or more fifth sound-generating apparatus 31E may include one or more of the first to third sound-generating apparatuses described above with reference to the examples of FIGS. 3A to 7C.

According to an embodiment of the present disclosure, the fifth sound-generating apparatus 31E, for vibrating the seat back interior materials 130E2 of one or more of the driver seat DS and the passenger seat PS, may be configured to output sound of about 150 Hz to about 20 kHz, but embodiments are not limited thereto. According to an embodiment of the present disclosure, the fifth sound-generating apparatus 31E, for vibrating the headrest interior materials 130E3 of one or more of the driver seat DS, the passenger seat PS, and the first to third rear seats BS1 to BS3, may be configured to output sound of about 2 kHz to about 20 kHz, or may be configured to output sound of about 150 Hz to about 20 kHz, but embodiments are not limited thereto.

With reference to the examples of FIGS. 1, 9, and 10, the sixth sound-generating apparatus 31F, according to an embodiment of the present disclosure, may be disposed between a handle frame and the handle interior material 130F to vibrate the handle interior material 130F. For example, the sixth sound-generating apparatus 31F may vibrate the handle interior material 130F to output sound based on a vibration of the handle interior material 130F. For example, the sixth sound-generating apparatus 31F may directly vibrate the handle interior material 130F to output sound based on a vibration of the handle interior material 130F. According to an embodiment of the present disclosure, the sixth sound-generating apparatus 31F may include a film-type sound generator or a coil-type sound generator. For example, the sixth sound-generating apparatus 31F may include one or more of the first to third sound-generating apparatuses described above with reference to the examples of FIGS. 3A to 7C. For example, the sixth sound-generating apparatus 31F may be a handle speaker or a steering speaker.

According to an embodiment of the present disclosure, the sixth sound-generating apparatus 31F may vibrate the handle interior material 130F to provide a driver with sound based on a vibration of the handle interior material 130F. For example, the sixth sound-generating apparatus 31F may directly vibrate the handle interior material 130F to provide the driver with the sound based on the vibration of the handle interior material 130F. Sound output by the sixth sound-generating apparatus 31F may be sound that is the same as or different from sound output from each of the first to fifth sound-generating apparatuses 31A to 31E. In an embodiment of the present disclosure, the sixth sound-generating apparatus 31F may output sound that is to be provided to only the driver. In another embodiment of the present disclosure, the sound output by the sixth sound-generating apparatus 31F and sound output by each of the first to fifth sound-generating apparatuses 31A to 31E may be combined and output.

With reference to the examples of FIGS. 1 and 9, the seventh sound-generating apparatus 31G may be disposed between the floor interior material 130G and the floor panel of the main frame of the vehicle structure. For example, the seventh sound-generating apparatus 31G may vibrate the floor interior material 130G to output sound based on a vibration of the floor interior material 130G. For example, the seventh sound-generating apparatus 31G may directly vibrate the floor interior material 130G to output the sound based on the vibration of the floor interior material 130G.

The seventh sound-generating apparatus 31G may be disposed between the floor interior material 130G and the floor panel disposed between the front seats DS and PS and the third rear seat BS3. For example, the seventh sound-generating apparatus 31G may include a film-type sound generator or a coil-type sound generator. For example, the seventh sound-generating apparatus 31G may include one or more of the first to third sound-generating apparatuses described above with reference to the examples of FIGS. 3A to 7C. For example, the seventh sound-generating apparatus 31G may be configured to output sound of about 150 Hz to about 20 kHz, but embodiments are not limited thereto. For example, the seventh sound-generating apparatus 31G may be a floor speaker, a bottom speaker, or an under speaker.

With reference to the examples of FIGS. 1, and 9 to 12, the vehicle 100, according to an embodiment of the present disclosure, may further include a vibration apparatus 30 that may be disposed at the vehicle interior material 130 exposed at an indoor space. For example, the vehicle 100, according to an embodiment of the present disclosure, may include only the vibration apparatus 30, disposed at the vehicle interior material 130, exposed at an indoor space instead of any vibration apparatus 30, disposed at the vehicle interior material 130, or may include all of the vibration apparatus 30, disposed at the vehicle interior material 130, exposed at an indoor space, and the vibration apparatus 30, disposed at the vehicle interior material 130.

According to an embodiment of the present disclosure, the vehicle interior material 130 may further include one or more of: a rear view mirror 130H, an overhead console 130I, a rear package interior material 130J, a glove box 130K, and a sun visor 130L, or the like.

The vibration apparatus 30 may be respectively disposed in one or more vibration region, which may be disposed at one or more of: the rear view mirror 130H, the overhead console 130I, the rear package interior material 130J, the glove box 130K, and the sun visor 130L. For example, the vibration apparatus 30 may include one or more sound-generating apparatuses 31H to 31L, which may be disposed at one or more of: the rear view mirror 130H, the overhead console 130I, the rear package interior material 130J, the glove box 130K, and the sun visor 130L. For example, vibration apparatus 30 may include one or more of eighth to twelfth sound-generating apparatuses 31H to 31L, and thus, may output sounds of one or more channels, e.g., single channel or multichannel.

With reference to the examples of FIGS. 1, and 9 to 12, the eighth sound-generating apparatus 31H may be disposed at the rear view mirror 130H, and may vibrate the rear view mirror 130H. For example, the eighth sound-generating apparatus 31H may be configured to output sound based on the vibration of the rear view mirror 130H. For example, the eighth sound-generating apparatus 31H may be configured to directly vibrate the rear view mirror 130H to output the sound based on the vibration of the rear view mirror 130H.

The eighth sound-generating apparatus 31H may be disposed between a mirror housing, connected to the vehicle structure, and the rear view mirror 130H, supported by the mirror housing. According to an embodiment of the present disclosure, the eighth sound-generating apparatus 31H may include a film-type sound generator or a coil-type sound generator. For example, the eighth sound-generating apparatus 31H may include one or more of the first to third sound-generating apparatuses described above with reference to the examples of FIGS. 3A to 7C. For example, the eighth sound-generating apparatus 31H may be configured to output sound of about 150 Hz to about 20 kHz, but embodiments are not limited thereto. For example, the eighth sound-generating apparatus 31H may be a mirror speaker.

With reference to the examples of FIGS. 1, 10, and 12, the ninth sound-generating apparatus 31I may be disposed at the overhead console 130I, and may vibrate a console cover of the overhead console 130I. For example, the ninth sound-generating apparatus 31I may be configured to output the sound based on the vibration of the interior material of the overhead console 130I. For example, the ninth sound-generating apparatus 31I may be configured to directly vibrate the console cover of the overhead console 130I to output the sound based on the vibration of the interior material of the overhead console 130I.

According to an embodiment of the present disclosure, the overhead console 130I may include a console box buried (e.g., embedded) into the roof panel, a lighting device disposed at the console box, and a console cover covering the lighting device and the console box. The ninth sound-generating apparatus 31I may be disposed between the console cover and the console box of the overhead console 130I and may vibrate the console cover. For example, the ninth sound-generating apparatus 31I may be disposed between the console cover and the console box of the overhead console 130I, and may directly vibrate the console cover. According to an embodiment of the present disclosure, the ninth sound-generating apparatus 31I may include a film-type sound generator or a coil-type sound generator. For example, the ninth sound-generating apparatus 31I may include one or more of the first to third sound-generating apparatuses described above with reference to the examples of FIGS. 3A to 7C. For example, the ninth sound-generating apparatus 31I may be configured to output sound of about 150 Hz to about 20 kHz, but embodiments are not limited thereto. For example, the ninth sound-generating apparatus 31I may be a console speaker or a lighting speaker.

According to an embodiment of the present disclosure, the vehicle 100 may further include one or more of: a center lighting box disposed at a center region of the roof interior material 130C, a center lighting device disposed at the center lighting box, and a center lighting cover covering the center lighting device. In this case, the ninth sound-generating apparatus 31I may be further disposed between a center lighting cover and a center lighting box of the center lighting device, and may additionally vibrate the center lighting cover.

With reference to the examples of FIGS. 1 and 9, the tenth sound-generating apparatus 31J may be disposed at the rear package interior material 130J, and may vibrate the rear package interior material 130J. For example, the tenth sound-generating apparatus 31J may be configured to output the sound based on the vibration of the rear package interior material 130J. For example, the tenth sound-generating apparatus 31J may be configured to directly vibrate the rear package interior material 130J to output the sound based on the vibration of the rear package interior material 130J.

The rear package interior material 130J may be disposed behind the first to third rear seats BS1 to BS3. For example, a portion of the rear package interior material 130J may be disposed under a rear glass window 230C.

The tenth sound-generating apparatus 31J may be disposed at a rear surface of the rear package interior material 130J, and may vibrate the rear package interior material 130J. For example, the tenth sound-generating apparatus 31J may directly vibrate the rear package interior material 130J. According to an embodiment of the present disclosure, the tenth sound-generating apparatus 31J may include a film-type sound generator or a coil-type sound generator. For example, the tenth sound-generating apparatus 31J may include one or more of the first to third sound-generating apparatuses described above with reference to the examples of FIGS. 3A to 7C. For example, the tenth sound-generating apparatus 31J may be a rear speaker.

According to an embodiment of the present disclosure, the rear package interior material 130J may include a first region corresponding to a rear portion (e.g., backward direction) of the first rear seat BS1, a second region corresponding to a rear portion of the second rear seat BS2, and a third region corresponding to a rear portion of the third rear seat BS3. According to an embodiment of the present disclosure, the tenth sound-generating apparatus 31J may be disposed to vibrate one or more of the first to third regions of the rear package interior material 130J. For example, the tenth sound-generating apparatus 31J may be disposed at each of the first and second regions of the rear package interior material 130J, or may be disposed at each of the first to third regions of the rear package interior material 130J. For example, the tenth sound-generating apparatus 31J may be configured to output sound at about 150 Hz to about 20 kHz, but embodiments are not limited thereto. For example, the tenth sound-generating apparatus 31J configured to vibrate one or more of the first to third regions of the rear package interior material 130J may each have the same sound output characteristic or different sound output characteristics.

With reference to the examples of FIGS. 1, 9 and 10, the eleventh sound-generating apparatus 31K may be disposed at a glove box 130K. For example, the eleventh sound-generating apparatus 31K may be configured to vibrate the glove box 130K to output the sound based on the vibration of the glove box 130K. For example, the eleventh sound-generating apparatus 31K may directly vibrate the glove box 130K to output the sound based on the vibration of the glove box 130K.

The glove box 130K may be disposed at a dashboard 130A corresponding to a front portion (e.g., a forward direction) of the passenger seat PS. The eleventh sound-generating apparatus 31K may be disposed at an inner surface of the glove box 130K and may vibrate the glove box 130K. For example, the eleventh sound-generating apparatus 31K may directly vibrate the glove box 130K. According to an embodiment of the present disclosure, the eleventh sound-generating apparatus 31K may include a film-type sound generator or a coil-type sound generator. For example, the eleventh sound-generating apparatus 31K may include one of more of the first to third sound-generating apparatuses described above with reference to the examples of FIGS. 3A to 7C. For example, the eleventh sound-generating apparatus 31K may be configured to output sound of about 150 Hz to about 20 kHz, but embodiments are not limited thereto. For example, the eleventh sound-generating apparatus 31K may be one or more of a woofer, a mid-woofer, and a sub-woofer. For example, the eleventh sound-generating apparatus 31K may be a glove box speaker.

With reference to the example of FIG. 10, the twelfth sound-generating apparatus 31L may be disposed at the sun visor 130L. For example, the twelfth sound-generating apparatus 31L may vibrate the sun visor 130L to output the sound based on the vibration of the sun visor 130L. For example, the twelfth sound-generating apparatus 31L may directly vibrate the sun visor 130L to output the sound based on the vibration of the sun visor 130L.

The sun visor 130L may include a first sun visor 130L1 corresponding to the driver seat DS and a second sun visor 130L2 corresponding to the passenger seat PS. The twelfth sound-generating apparatus 31L may be disposed at one or more of the first sun visor 130L1 and the second sun visor 130L2. For example, the twelfth sound-generating apparatus 31L may vibrate one or more of the first sun visor 130L1 and the second sun visor 130L2. For example, the twelfth sound-generating apparatus 31L may directly vibrate one or more of the first sun visor 130L1 and the second sun visor 130L2. According to an embodiment of the present disclosure, the twelfth sound-generating apparatus 31L may include a film-type sound generator or a coil-type sound generator. For example, the twelfth sound-generating apparatus 31L may include one or more of the first to third sound-generating apparatuses described above with reference to the examples of FIGS. 3A to 7C. For example, the twelfth sound-generating apparatus 31L may be configured to output sound of about 150 Hz to about 20 kHz, but embodiments are not limited thereto. For example, the twelfth sound-generating apparatus 31L may be a sun visor speaker.

According to an embodiment of the present disclosure, one or more of the first sun visor 130L1 and the second sun visor 130L2 may further include a sun visor mirror. For example, the twelfth sound-generating apparatus 31L may be configured to vibrate a sun visor mirror of one or more of the first sun visor 130L1 and the second sun visor 130L2. The twelfth sound-generating apparatus 31L may directly vibrate the sun visor mirror of one or more of the first sun visor 130L1 and the second sun visor 130L2. The twelfth sound-generating apparatus 31L, configured to vibrate the sun visor mirror, may include a film-type sound generator or a coil-type sound generator. For example, the twelfth sound-generating apparatus 31L may include one or more of the first to third sound-generating apparatuses described above with reference to the examples of FIGS. 3A to 7C.

With reference to the examples of FIGS. 1, and 9 to 13, the vehicle 100, according to an embodiment of the present disclosure, may further include a vibration apparatus 30 disposed at the vehicle glass window 230. For example, the vehicle 100, according to an embodiment of the present disclosure, may include the vibration apparatus 30 disposed at the vehicle glass window 230, instead of one or more of: the vibration apparatus 30 disposed at the vehicle interior material 130 and the vibration apparatus 30 disposed at the vehicle interior material 130 exposed at an indoor location. As another example, the vehicle 100 may include all of the vibration apparatus 30 disposed at the vehicle interior material 130, the vibration apparatus 30 disposed at the vehicle interior material 130 exposed at an indoor location, and the vibration apparatus 30 disposed at the vehicle glass window 230. The vehicle 100, according to an embodiment of the present disclosure, may include the vibration apparatus 30 described above with reference FIG. 13, instead of one or more of the vibration apparatus 30 described above with reference FIGS. 9 to 12, or may include all of the vibration apparatus 30 described above with reference FIGS. 9 to 13.

The vibration apparatus 30 may include one or more sound-generating apparatuses 31M to 31P disposed at the vehicle glass window 230. For example, the vibration apparatus 30 may include one or more of thirteenth to sixteenth sound-generating apparatuses 31M to 31P, and thus, may output sounds of one or more channels, e.g., a single channel or multichannel. For example, the vibration apparatus 30 may be a transparent sound-generating apparatus.

Each of the thirteenth to sixteenth sound-generating apparatuses 31M to 31P, according to an embodiment of the present disclosure, may include a transparent or semitransparent sound-generating apparatus. For example, when each of the thirteenth to sixteenth sound-generating apparatuses 31M to 31P includes the transparent sound-generating apparatus, one or more of the thirteenth to sixteenth sound-generating apparatuses 31M to 31P may vibrate the vehicle glass window 230 to output sound based on a vibration of the vehicle glass window 230. For example, one or more of the thirteenth to sixteenth sound-generating apparatuses 31M to 31P may directly vibrate the vehicle glass window 230 to output sound based on a vibration of the vehicle glass window 230. For example, when one or more of the thirteenth to sixteenth sound-generating apparatuses 31M to 31P include the transparent sound-generating apparatus 33, one or more of the thirteenth to sixteenth sound-generating apparatuses 31M to 31P may output sound by self-vibration thereof.

According to an embodiment of the present disclosure, the vehicle glass window 230 may include a front glass window 230A, a side glass window 230B, and a rear glass window 230C. According to an embodiment of the present disclosure, the vehicle glass window 230 may further include a roof glass window 230D. For example, when the vehicle 100 includes the roof glass window 230D, a portion of a region of the roof interior material 130C and the roof frame described above may be replaced with the roof glass window 230D. For example, when the vehicle 100 includes the roof glass window 230D, the third sound-generating apparatus 31C may be configured to vibrate a periphery portion of the roof interior material 130C surrounding the roof glass window 230D.

With reference to the examples of FIGS. 1, 9, and 10, the thirteenth sound-generating apparatus 31M, according to an embodiment of the present disclosure, may be disposed at the front glass window 230A, and may be configured to output sound based on a self-vibration thereof, or may be configured to vibrate the front glass window 230A to output sound based on a vibration of the front glass window 230A. For example, the thirteenth sound-generating apparatus 31M may directly vibrate the front glass window 230A to output the sound based on the vibration of the front glass window 230A.

According to an embodiment of the present disclosure, the front glass window 230A may include a first region corresponding to the driver seat DS, a second region corresponding to the passenger seat PS, and a third region (e.g., a middle region) between the first region and the second region. For example, the thirteenth sound-generating apparatus 31M may be disposed at one or more of the first to third regions. For example, the thirteenth sound-generating apparatus 31M may be disposed at each of the first and second regions of the front glass window 230A, or may be disposed at each of the first to third regions. For example, the thirteenth sound-generating apparatus 31M, disposed at one or more of the first to third regions of the front glass window 230A, may have the same sound output characteristic or different sound output characteristics. For example, the thirteenth sound-generating apparatus 31M may be configured to output sound of about 150 Hz to about 20 kHz, but embodiments are not limited thereto. For example, the thirteenth sound-generating apparatus 31M may be a front window speaker.

With reference to the examples of FIGS. 1, 11, and 13, the fourteenth sound-generating apparatus 31N, according to an embodiment of the present disclosure, may be disposed at the side glass window 230B, and may be configured to output sound based on self-vibration thereof, or may be configured to vibrate the side glass window 230B to output sound based on a vibration of the side glass window 230B. For example, the fourteenth sound-generating apparatus 31N may directly vibrate the side glass window 230B to output the sound based on the vibration of the side glass window 230B.

According to an embodiment of the present disclosure, the side glass window 230B may include a first side glass window (e.g., a left front window) 230B1, a second side glass window (e.g., a right front window) 230B2, a third side glass window (e.g., a left rear window) 230B3, and a fourth side glass window (e.g., a right rear window) 230B4.

According to an embodiment of the present disclosure, the fourteenth sound-generating apparatus 31N may be disposed at one or more of the first to fourth side glass windows 230B1 to 230B4. For example, one or more of the first to fourth side glass windows 230B1 to 230B4 may include one or more fourteenth sound-generating apparatuses 31N.

According to an embodiment of the present disclosure, the fourteenth sound-generating apparatus 31N may be disposed at one or more of the first to fourth side glass windows 230B1 to 230B4, and may be configured to output sound based on self-vibration thereof, or may be configured to vibrate a corresponding side glass window of the first to fourth side glass windows 230B1 to 230B4 to output the sound. For example, the fourteenth sound-generating apparatus 31N may directly vibrate the first to fourth side glass windows 230B1 to 230B4 to output sound. For example, the fourteenth sound-generating apparatus 31N may be configured to output sound of about 150 Hz to about 20 kHz, but embodiments are not limited thereto. For example, the fourteenth sound-generating apparatus 31N, disposed at one or more of the first to fourth side glass windows 230B1 to 230B4, may each have the same sound output characteristic or different sound output characteristics. For example, the fourteenth sound-generating apparatus 31N may be configured to output sound of about 150 Hz to about 20 kHz, but embodiments are not limited thereto. For example, the fourteenth sound-generating apparatus 31N may be a side window speaker or a side surface window speaker.

With reference to the example of FIG. 9, the fifteenth sound-generating apparatus 31O, according to an embodiment of the present disclosure, may be disposed at the rear glass window 230C, and may be configured to output sound by self-vibration thereof, or may be configured to vibrate the rear glass window 230C to output sound based on a vibration of the rear glass window 230C. For example, the fifteenth sound-generating apparatus 31O may directly vibrate the rear glass window 230C to output the sound based on the vibration of the rear glass window 230C.

According to an embodiment of the present disclosure, the rear glass window 230C may include a first region corresponding to a rear portion (e.g., a backward direction) of the first rear seat BS1, a second region corresponding to a rear portion of the second rear seat BS2, and a third region corresponding to a rear portion of the third rear seat BS3. According to an embodiment of the present disclosure, the fifteenth sound-generating apparatus 31O may be disposed at one or more of the first to third regions of the rear glass window 230C. For example, the fifteenth sound-generating apparatus 31O may be disposed at each of the first and second regions of the rear glass window 230C, or may be disposed at each of the first to third regions. For example, the fifteenth sound-generating apparatus 31O may be configured to output sound of about 150 Hz to about 20 kHz, but embodiments are not limited thereto. For example, the fifteenth sound-generating apparatus 31O, disposed at one or more of the first to third regions of the rear glass window 230C, may have the same sound output characteristic or different sound output characteristics. For example, the fifteenth sound-generating apparatus 31O, disposed at each of the first and second regions of the rear glass window 230C, may be configured to output sound of about 150 Hz to about 20 kHz, but embodiments are not limited thereto. For example the fifteenth sound-generating apparatus 31O may be one or more of a woofer, a mid-woofer, and a sub-woofer. For example, the fifteenth sound-generating apparatus 31O may be a rear window speaker.

With reference to the example of FIG. 12, the sixteenth sound-generating apparatus 31P, according to an embodiment of the present disclosure, may be disposed at the roof glass window 230D, and may be configured to output sound by self-vibration thereof, or may be configured to vibrate the roof glass window 230D to output sound based on a vibration of the roof glass window 230D. For example, the sixteenth sound-generating apparatus 31P may directly vibrate the roof glass window 230D to output the sound based on the vibration of the roof glass window 230D.

The roof glass window 230D, according to an embodiment of the present disclosure, may be disposed over the front seats DS and PS of the vehicle 100. For example, the sixteenth sound-generating apparatus 31P may be disposed at a middle region of the roof glass window 230D. For example, the sixteenth sound-generating apparatus 31P may be configured to output sound of about 150 Hz to about 20 kHz, but embodiments are not limited thereto. For example, the sixteenth sound-generating apparatus 31P may be a roof window speaker.

According to another embodiment of the present disclosure, the roof glass window 230D may be disposed over the front seats DS and PS of the vehicle 100, or may be disposed over the front seats DS and PS and the rear seats BS1 to BS3. For example, the roof glass window 230D may include a first region corresponding to the front seats DS and PS, and a second region corresponding to the rear seats BS1 to BS3. Also, the roof glass window 230D may include a third region between the first region and the second region. For example, the sixteenth sound-generating apparatus 31P may be disposed at one or more of the first and second regions of the roof glass window 230D, or may be disposed at one or more of the first to third regions of the roof glass window 230D. For example, the sixteenth sound-generating apparatus 31P may be configured to output sound of about 150 Hz to about 20 kHz, but embodiments are not limited thereto. For example, the sixteenth sound-generating apparatus 31P, disposed at one or more of the first to third regions of the roof glass window 230D, may have the same sound output characteristic or different sound output characteristics.

With reference to the examples of FIGS. 1, 9, and 10, the vehicle 100, according to an embodiment of the present disclosure, may further include a woofer speaker WS, which may be disposed at one or more of: a dashboard 130A, a door frame 130B, and a rear package interior material 130J. The woofer speaker WS, according to an embodiment of the present disclosure, may include one or more of a woofer, a mid-woofer, and a sub-woofer. For example, the woofer speaker WS may be a speaker that outputs sound of about 60 Hz to about 150 Hz, but embodiments are not limited thereto. Therefore, the woofer speaker WS may output sound of about 60 Hz to about 150 Hz, and thus, may enhance a low-pitched sound band characteristic of sound that may be output to an indoor space of the vehicle 100.

According to an embodiment of the present disclosure, the woofer speaker WS may be disposed at one or more of first and second regions of the dashboard 130A. According to an embodiment of the present disclosure, the woofer speaker WS may be disposed at each of first to fourth door frames of the door interior material 130D, and may be exposed at a lower region of each of the first to fourth door interior materials 130D1 to 130D4 of the door interior material 130D. According to an embodiment of the present disclosure, the woofer speaker WS may be disposed at one or more of the first and second regions of the rear package interior material 130J. For example, the fourth sound-generating apparatus 31D, disposed in the lower regions of one or more of the first to fourth door interior materials 130D1 to 130D4, may be replaced by the woofer speaker WS.

With reference to the examples of FIGS. 1, 9, and 10, the vehicle 100, according to an embodiment of the present disclosure, may further include an instrument panel device 150 and an infotainment device 170. The instrument panel device 150, according to an embodiment of the present disclosure, may be disposed at a first region of the dashboard 130A to face the driver seat DS. The instrument panel device 150 may include a display 151 (e.g., a first display), which may be disposed at the first region of the dashboard 130A, e.g., to face the driver seat DS.

The first display 151 may include the display apparatus. For example, the instrument panel device 150 may output sound, generated based on a vibration of a display panel, based on a vibration of one or more sound-generating apparatuses 30 included in the first display 151, toward the driver seat DS. For example, the sound-generating apparatus 30, disposed in the first display 151 of the instrument panel device 150, may be configured to output sound of about 150 Hz to about 20 kHz, but embodiments are not limited thereto.

The infotainment device 170 may be disposed at a third region of the dashboard 130A. The infotainment device 170, according to an embodiment of the present disclosure, may be fixed on the third region of the dashboard 130A in an upright state.

The infotainment device 170, according to another embodiment of the present disclosure, may be installed to be raised and lowered at the third region of the dashboard 130A. For example, the infotainment device 170 may be received or accommodated into the dashboard 130A, e.g., based on the turn-off of the vehicle 100 or the manipulation of a vehicle passenger, and may protrude to a region on the dashboard 130A, e.g., based on the turn-on of the vehicle 100 or the manipulation of the vehicle passenger.

The infotainment device 170, according to an embodiment of the present disclosure, may include a display 171 (e.g., a second display) disposed at the third region of the dashboard 130A, and a display elevation part. The second display 171 may include the display apparatus. For example, the infotainment device 170 may output sound, generated based on a vibration of a display panel, based on a vibration of one or more sound-generating apparatus 30 included in the second display 171, toward the driver seat DS. For example, the sound-generating apparatus 30, disposed at the second display 171 of the infotainment device 170, may be configured to output sound of about 150 Hz to about 20 kHz, but embodiments are not limited thereto.

The display elevation part may be disposed at the third region of the dashboard 130A, and may support the second display 171 to be raised and lowered. For example, the display elevation part may raise the second display 171, e.g., based on the turn-on of the vehicle or the manipulation of the vehicle passenger, thereby allowing the second display 171 to protrude to a region on the dashboard 130A. Also, the display elevation part may lower the second display 171, e.g., based on the turn-off of the vehicle 100 or the manipulation of the vehicle passenger, thereby allowing the second display 171 to be received or accommodated into the dashboard 130A.

The display apparatus of each of the first display 151 and the second display 171, according to an embodiment of the present disclosure, may be a display that is disposed at one or more of an instrument panel device and an infotainment device, which may be classified into vehicle interior materials, or may be a display that is embedded in or buried into one or more of a headrest and a rear surface of a seat of a vehicle, but embodiments of the present disclosure are not limited thereto. For example, the display apparatus disposed at the instrument panel device 150 may provide a driver with various information, such as vehicle state information and driving-related information, such as a driving time, a velocity, fuel quantity, and engine revolutions per minute (RPMs) of a vehicle. For example, the display apparatus 50 disposed at the infotainment device (e.g., an infotainment system or an infotainment module) may be connected to a vehicle convenience system, such as an audio system, an air conditioning system, and a multimedia system, and a navigation system, which may be mounted in a vehicle, may display a control icon for controlling a corresponding vehicle convenience system and navigation information provided from the navigation system, and may provide a passenger of a vehicle with sound corresponding to a sound signal provided from the audio system and/or the multimedia system.

The display apparatus according to an embodiment of the present disclosure may include a display panel and one or more vibration apparatus 30 disposed at a rear surface (e.g., a backside surface) of the display panel. The display panel may display an electronic image or a digital image. For example, the display panel may output light and display an image.

According an embodiment of the present disclosure, the display panel may be any kind of flat display panel or curved display panel, such as a liquid crystal display panel, an organic light-emitting display panel, a quantum dot light-emitting display panel, a micro light-emitting diode display panel, an electrophoresis display panel, and an electro wetting display panel, or the like, but embodiments of the present disclosure are not limited thereto. According to another embodiment of the present disclosure, the display panel may be a transparent display panel or a flexible display panel. According to another embodiment of the present disclosure, the display panel may be a display panel with an integrated touch panel. For example, the display panel with an integrated touch panel may include a touch panel attached on a display panel, or may include a touch electrode layer disposed inside the display panel.

The vibration apparatus 30, according to an embodiment of the present disclosure, may vibrate the display panel in response to a sound signal (e.g., a voice signal) from the outside. For example, the vibration apparatus 30 may directly vibrate the display panel in response to the sound signal (e.g., the voice signal) from the outside. As an embodiment of the present disclosure, the vibration apparatus 30 may vibrate based on a sound signal synchronized with an image displayed by the display panel to vibrate the display panel. As another embodiment of the present disclosure, the vibration apparatus 30 may vibrate based on a haptic feedback signal (e.g., a tactile feedback signal) synchronized with a user touch applied to a touch panel (e.g., a touch sensor layer) to vibrate the display panel. Accordingly, the display panel may vibrate based on vibrations of the vibration apparatus 30 to provide a user (e.g., a viewer) with one or more of sound and a haptic feedback.

Therefore, the vehicle 100, according to an embodiment of the present disclosure, may output sound to the indoor space through one or more of the vibration apparatus 30 disposed at the vehicle interior material 130, the vibration apparatus 30 disposed at the vehicle interior material 130 exposed at an indoor location, and the vibration apparatus 30 disposed at the vehicle glass window 230. Thus, the vehicle 100 may output the sound by a vehicle interior material as a vibration plate, thereby outputting a multichannel surround stereo sound. Also, the vehicle 100 according to an embodiment of the present disclosure may output sound by, as a vibration plate, a display panel of one or more of the displays 151 and 171 of each of the instrument panel device 150 and the infotainment device 170, and may output a more realistic multichannel surround stereo sound through each of the instrument panel device 150 and the infotainment device 170.

Figure 14:
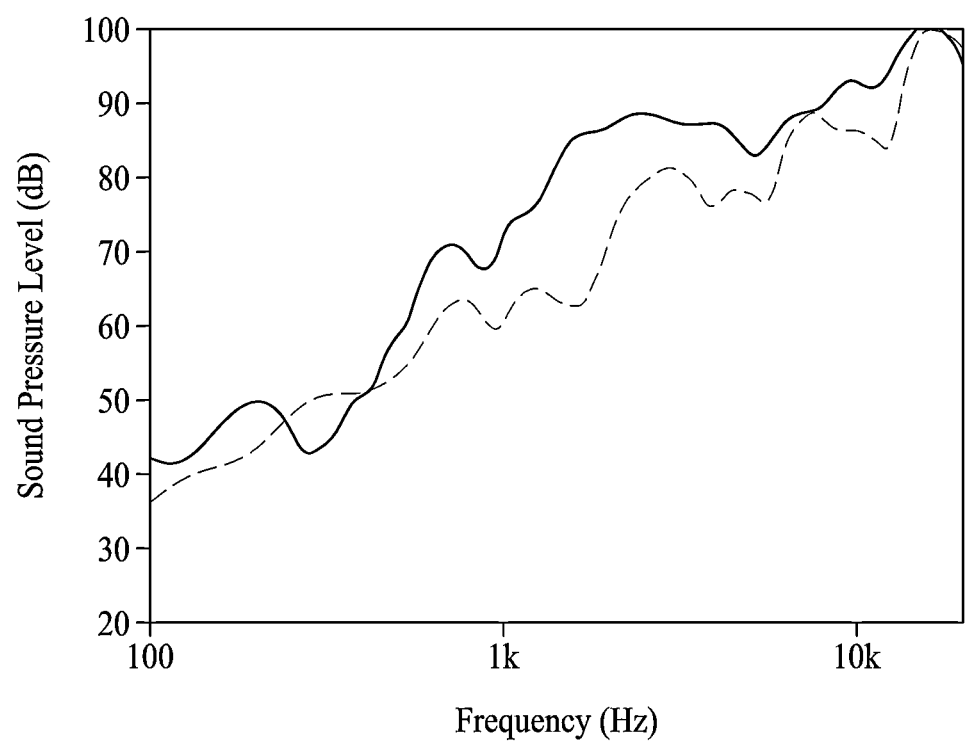
FIG. 14 illustrates a sound output characteristic according to an embodiment of the present disclosure.

FIG. 14 illustrates a sound output characteristic according to an embodiment of the present disclosure.

A sound output characteristic may be measured by a sound analysis apparatus. The sound analysis apparatus may include a sound card that may transmit or receive sound to or from a control personal computer (PC), an amplifier that may amplify a signal generated from the sound card and transfer the amplified signal to a vibration apparatus, and a microphone that may collect sound generated by a vehicle interior material based on driving of the vibration apparatus. The sound collected through the microphone may be input to the control PC through the sound card, and a control program may check the input sound to analyze the sounds of the vibration apparatus. In FIG. 14, the abscissa axis represents a frequency in hertz (Hz), and the ordinate axis represents a sound pressure level (SPL) in decibels (dB).

A sound output characteristic has been measured in an anechoic chamber, which is closed in all directions, and measurement equipment has used Audio Precision company's APx525 audio analyzer. Measurement has been performed under a condition in which an applied voltage is 30 Vpp, and an applied frequency signal is applied as a sine sweep within a range of 20 Hz to 20 kHz, and ⅓ octave smoothing has been performed on a measurement result. A measurement method is not limited thereto.

The sound output characteristic has been measured under a condition in which an angle between the microphone and a horizontal plane, from the bendable region of the examples of FIGS. 2 and 3B, is adjusted to be 60 degrees, and a separation distance between a sound-generating apparatus and the microphone is adjusted to be 50 cm. For example, 60 degrees may be an angle that enables a driver to listen to sound in a vehicle. For example, a sound-listening position of a person in a vehicle may be disposed more upward than a door of the vehicle. A sound pressure level has been measured based on a real listening environment of a person in a vehicle.

With reference to the example of FIG. 14, a dotted line represents a sound output characteristic of a configuration using the example of FIG. 2, and a solid line represents a sound output characteristic of a configuration using the example of FIG. 3B. For example, the dotted line represents an example in which a flat sound-generating apparatus is provided, and the solid line represents an example in which a flat sound-generating apparatus and a curved sound-generating apparatus are provided. The sound output characteristic has been measured in a case in which a sound-generating apparatus is attached on a door interior material that is a vehicle interior material.

For example, in a frequency of 100 Hz to 200 kHz, the dotted line represents a sound pressure level of about 66.8 dB, and the solid line represents a sound pressure level of about 73.0 dB. Thus, as compared with the dotted line, it may be seen that a sound pressure level represented by the solid line is enhanced by about 6.2 dB. Accordingly, when a sound-generating apparatus is provided at a curved portion of a vehicle interior material, it may be seen that a sound pressure level is enhanced at a listening position.

For example, in a frequency of 500 Hz to 2 kHz, the dotted line represents a sound pressure level of about 62.1 dB, and the solid line represents a sound pressure level of about 74.2 dB. Thus, as compared with the dotted line, it may be seen that a sound pressure level represented by the solid line is enhanced by about 12.1 dB. A frequency of 500 Hz to 2 kHz may be a voice range of a person. In a frequency of 500 Hz to 2 kHz, corresponding to a voice range of a person, a sound pressure level is enhanced, and thus, it may be seen that a sound-generating apparatus may be applied as a speaker in a vehicle.

Accordingly, when a curved sound-generating apparatus, having a shape of a bendable region, is provided, it may be seen that a sound pressure level characteristic is more enhanced at an orientation and listening position. Therefore, according to an embodiment of the present disclosure, a sound-generating apparatus may be disposed based on bending of a bendable region, thereby providing a vehicle or an apparatus for enhancing a sound characteristic and/or a sound pressure level characteristic. Also, according to an embodiment of the present disclosure, a sound-generating apparatus may be disposed based on a curved portion in a vehicle, and thus, may be applied as a speaker of the vehicle.

A vibration apparatus according to an embodiment of the present disclosure may be applied to a vibration apparatus disposed at an apparatus. The vibration apparatus according to an embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, sliding apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, home appliances, etc. Also, the vibration apparatus according to an embodiment of the present disclosure may be applied to organic light-emitting lighting apparatuses or inorganic light-emitting lighting apparatuses. When the vibration apparatus of an embodiment of the present disclosure is applied to lighting apparatuses, the vibration apparatus may act as lighting and a speaker. Also, when the vibration apparatus of an embodiment of the present disclosure is applied to a mobile device, the vibration apparatus may act as one or more of a speaker, a receiver, and a haptic device, but embodiments of the present disclosure are not limited thereto.

A sound-generating apparatus and a vehicle including the same according to an embodiment of the present disclosure will be described below.

A sound-generating apparatus according to an embodiment of the present disclosure may include a plurality of first portions at each of first to third regions, and a plurality of second portions between the plurality of first portions, at each of the first to third regions, two or more second portions, at any one region, among the first to third regions, may have a cross-sectional shape that differs from a cross-sectional shape of a second portion disposed at each of the other regions, among the first to third regions.

According to some embodiments of the present disclosure, two or more first portions having a cross-sectional surface of a hexagonal shape and two or more second portions having a cross-sectional surface of a hexagonal shape are disposed at at least one region among the first to third regions.

According to some embodiments of the present disclosure, any one region, among the first to third regions may be a bending region that may be bendable from the other regions, among the first to third regions. For example, any one region of the first to third regions may be a bending region, which may be bendable by 90 degrees from the other region.

According to some embodiments of the present disclosure, the second portions disposed at a bending region among the first to third regions have a cross-sectional shape that differs from a cross-sectional shape of a second portion disposed at a non-bending region According to some embodiments of the present disclosure, the third region between the first region and the second region may be a bending region that may be bendable by 90 degrees from each of the first region and the second region. For example, the third region may be a bending region, which may be bendable by 90 degrees from each of the first region and the second region.

According to some embodiments of the present disclosure, each of the plurality of first portions and the plurality of second portions may include a first surface, a second surface opposite to the first surface, and a side surface between the first surface and the second surface, the any one region of the first to third regions may include a bendable region, a side surface of two or more second portions at the bendable region may include a concave portion, and another second portion at an another region other than the bendable region of the first to third regions may include a cross-sectional surface having a tetragonal shape.

According to some embodiments of the present disclosure, at least one first portion between the two or more second portions at the bendable region may include a protrusion portion protruding toward a concave portion of an adjacent second portion. According to some embodiments of the present disclosure, each of the two or more second portions at the bendable region may include a cross-sectional surface having a hexagonal shape, the hexagonal shape having a concave side surface. According to some embodiments of the present disclosure, in each of the two or more second portions at the bendable region, the first surface and the second surface may have the same width, and a shortest distance between a first side surface and a second side surface, which may be parallel between the first surface and the second surface, may be smaller than a width of the first surface.

According to some embodiments of the present disclosure, in one second portion of the two or more second portions at the bendable region, the first side surface and the second side surface may contact each other. According to some embodiments of the present disclosure, the bendable region may include three second portions, and a center second portion at a center of the three second portions, and side second portions at both sides of the center portion, may have different cross-sectional shapes.

According to some embodiments of the present disclosure, the plurality of second portions may have a first width and a second width that may be half of a height of the second portion, and in each of the two or more second portions at the bendable region, the first width may differ from the second width. According to some embodiments of the present disclosure, widths of the second portions at the bendable region may differ from each other. According to some embodiments of the present disclosure, a width of the first portion at the bendable region may differ from a width of the second portion at the bendable region.

According to some embodiments of the present disclosure, the plurality of first portions may include an inorganic material, and the plurality of second portions may include an organic material. According to some embodiments of the present disclosure, widths of the first to third regions may differ from each other. According to some embodiments of the present disclosure, any one region, among the first to third regions may have a width that may be wider than a width of each of the other regions. According to some embodiments of the present disclosure, a modulus of a second portion at any one region, among the first to third regions, may be higher than a modulus of a second portion at another region, among the first to third regions.

A vehicle according to some embodiments of the present disclosure may include a vehicle interior material comprising a vibration region comprising a curved portion, and a vibration apparatus at the vibration region, the vibration apparatus may include the sound-generating apparatus, the sound-generating apparatus may include a plurality of first portions at each of first to third regions, and a plurality of second portions between the plurality of first portions, at each of the first to third regions, two or more second portions at any one region, among the first to third regions, may have a cross-sectional shape that differs from a cross-sectional shape of a second portion disposed at each of the other regions, among the first to third regions.

According to some embodiments of the present disclosure, the any one region of the first to third regions of the sound-generating apparatus may be disposed at the curved portion of the vibration region. According to some embodiments of the present disclosure, the vibration region may further include a peripheral portion connected to the curved portion, the vibration region having a non-curved shape, and the any one region, among the first to third regions of the sound-generating apparatus may be disposed at the curved portion, and another region, among the first to third regions of the sound-generating apparatus may be at the peripheral portion of the vibration region.

According to some embodiments of the present disclosure, the vehicle interior material may include one or more of: a plastic, a fiber, a leather, a wood, a cloth, a metal, and a glass. According to some embodiments of the present disclosure, the vehicle interior material may include one or more of: a dashboard, a pillar interior material, a roof interior material, a door interior material, a seat interior material, a handle interior material, and a floor interior material, and the vibration apparatus may be disposed at the vibration region of one or more of: the dashboard, the pillar interior material, the roof interior material, the door interior material, the seat interior material, the handle interior material, and the floor interior material. According to some embodiments of the present disclosure, the vehicle interior material may include one or more of: a rear view mirror, an overhead console, a rear package interior material, a glove box, and a sun visor, and the vibration apparatus may be disposed at the vibration region of one or more of: the rear view mirror, the overhead console, the rear package interior material, the glove box, and the sun visor.

It will be apparent to those skilled in the art that various modifications and variations may be made in the present disclosure without departing from the technical idea or scope of the disclosure. Thus, it is intended that embodiments of the present disclosure cover the modifications and variations of the disclosure provided they come within the scope of the appended claims and their equivalents.

What is claimed is:

1. A sound-generating apparatus, comprising:
a plurality of first portions at each of first to third regions; and
a plurality of second portions between the plurality of first portions, at each of the first to third regions,
wherein two or more second portions, at any one region, among the first to third regions, have a cross-sectional shape that differs from a cross-sectional shape of a second portion disposed at each of the other regions, among the first to third regions.

2. The sound-generating apparatus of claim 1, wherein any one region, among the first to third regions, is a bending region that is bendable from another of the other regions, among the first to third regions.

3. The sound-generating apparatus of claim 2, wherein the plurality of second portions have:
a first width; and
a second width that is half of a height of the second portion; and
in each of the two or more second portions at the bendable region, the first width differs from the second width.

4. The sound-generating apparatus of claim 2, wherein widths of the second portions at the bendable region differ from each other.

5. The sound-generating apparatus of claim 2, wherein a width of the first portion at the bendable region differs from a width of the second portion at the bendable region.

6. The sound-generating apparatus of claim 1, wherein the third region, which is between the first region and the second region, is a bending region that is bendable from each of the first region and the second region.

7. The sound-generating apparatus of claim 1, wherein:
each of the plurality of first portions and the plurality of second portions comprises:
a first surface;
a second surface opposite to the first surface; and
a side surface between the first surface and the second surface;
the any one region of the first to third regions comprises a bendable region;
a side surface of two or more second portions at the bendable region comprises a concave portion; and
another second portion, at an another region other than the bendable region of the first to third regions, comprises a cross-sectional surface having a tetragonal shape.

8. The sound-generating apparatus of claim 7, wherein at least one first portion between the two or more second portions at the bendable region comprises a protrusion portion protruding toward a concave portion of an adjacent second portion.

9. The sound-generating apparatus of claim 7, wherein each of the two or more second portions at the bendable region comprises a cross-sectional surface having a hexagonal shape, the hexagonal shape having a concave side surface.

10. The sound-generating apparatus of claim 7, wherein, in each of the two or more second portions at the bendable region:
the first surface and the second surface have the same width; and
a shortest distance between a first side surface and a second side surface, which are parallel between the first surface and the second surface, is smaller than a width of the first surface.

11. The sound-generating apparatus of claim 10, wherein, in one second portion of the two or more second portions at the bendable region, the first side surface and the second side surface contact each other.

12. The sound-generating apparatus of claim 7, wherein:
the bendable region comprises three second portions; and
a center second portion at a center of the three second portions, and side second portions at both sides of the center portion, have different cross-sectional shapes.

13. The sound-generating apparatus of claim 1, wherein:
the plurality of first portions comprises an inorganic material; and
the plurality of second portions comprises an organic material.

14. The sound-generating apparatus of claim 1, wherein widths of the first to third regions differ from each other.

15. The sound-generating apparatus of claim 1, wherein any one region, among the first to third regions, has a width that is wider than a width of each of the other regions.

16. The sound-generating apparatus of claim 1, wherein a modulus of a second portion at any one region, among the first to third regions, is higher than a modulus of a second portion at another region, among the first to third regions.

17. A vehicle, comprising:
a vehicle interior material comprising a vibration region comprising a curved portion; and
a vibration apparatus at the vibration region, the vibration apparatus comprising the sound-generating apparatus of claim 1.

18. The vehicle of claim 17, wherein the any one region, among the first to third regions of the sound-generating apparatus, is disposed at the curved portion of the vibration region.

19. The vehicle of claim 17, wherein:
the vibration region further comprises a peripheral portion connected to the curved portion, the vibration region having a non-curved shape;

the any one region, among the first to third regions of the sound-generating apparatus, is at the curved portion; and another region, among the first to third regions of the sound-generating apparatus, is at the peripheral portion of the vibration region.

20. The vehicle of claim 17, wherein the vehicle interior material comprises a material comprising one or more of: a plastic, a fiber, a leather, a wood, a cloth, a metal, and a glass.

21. The vehicle of claim 17, wherein: the vehicle interior material comprises one or more of: a dashboard, a pillar interior material, a roof interior material, a door interior material, a seat interior material, a handle interior material, and a floor interior material; and the vibration apparatus is at the vibration region of one or more of: the dashboard, the pillar interior material, the roof interior material, the door interior material, the seat interior material, the handle interior material, and the floor interior material.

22. The vehicle of claim 17, wherein:
the vehicle interior material comprises one or more of: a rear view mirror, an overhead console, a rear package interior material, a glove box, and a sun visor; and the vibration apparatus is at the vibration region of one or more of: the rear view mirror, the overhead console, the rear package interior material, the glove box, and the sun visor.

\* \* \* \* \*